(12) United States Patent
Condon et al.

(10) Patent No.: US 7,494,175 B2
(45) Date of Patent: Feb. 24, 2009

(54) MOTOR VEHICLE

(75) Inventors: Alan Condon, East Hanningfield (GB); Torsten Gerhardt, London (GB); John Harding, Leigh-on-Sea (GB); Boris Ferko, Maastricht (NL); Steve Fleming, Hockley (GB); Jan Kamenistiak, Bratislava (SK)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 11/427,214

(22) Filed: Jun. 28, 2006

(65) Prior Publication Data

US 2008/0001426 A1 Jan. 3, 2008

(51) Int. Cl.
*B60J 7/08* (2006.01)

(52) U.S. Cl. ............. 296/110; 296/107.01; 296/107.08; 296/108

(58) Field of Classification Search ............ 296/107.01, 296/107.08, 107.16, 107.17, 107.18, 107.19, 296/107.2, 108, 110
See application file for complete search history.

(56) References Cited

U.S. PATENT DOCUMENTS

2006/0261630 A1* 11/2006 Fleming et al. ........ 296/107.08

* cited by examiner

*Primary Examiner*—Lori L Lyjak
(74) *Attorney, Agent, or Firm*—Dickinson Wright PLLC; Greg Brown

(57) ABSTRACT

A motor vehicle 1, 101 is disclosed having front and rear roof members 5 and 6 which can be moved from raised to stowed positions to change the style of the motor vehicle from a two box style to a convertible or pick-up style. The rear roof member 6 is stowed at an inclined angle between two rows of seats 9, 10 of the motor vehicle 1, 101 so as to occupy little space within the vehicle 1, 101.

10 Claims, 36 Drawing Sheets

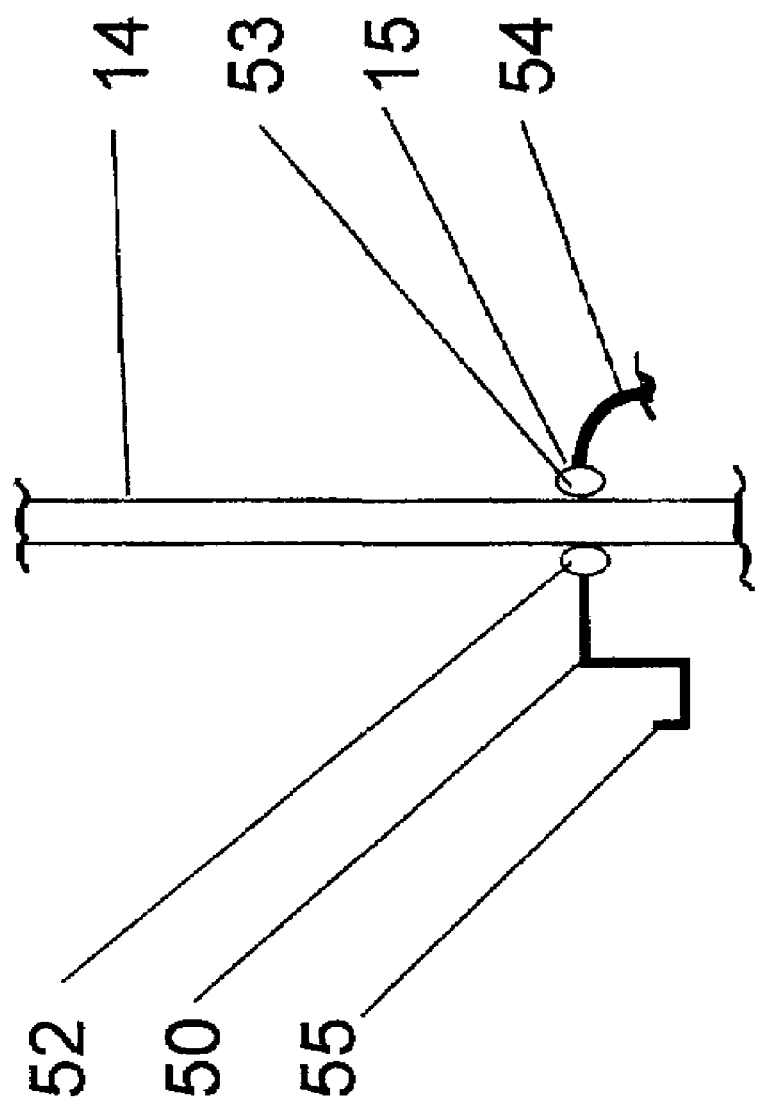

MOTOR VEHICLE

FIELD OF THE INVENTION

This invention relates to motor vehicles and in particular relates to a motor vehicle that is transformable from one style of motor vehicle to another style of motor vehicle.

BACKGROUND OF THE INVENTION

It is well known to provide motor vehicles of varying styles such as, for example, hatchback, MPV, estate pick-up and convertible.

With recent changes in lifestyle many vehicle purchasers are desirous of having one style of motor vehicle for some uses and an alternative style for other purposes. For example, some people would like to drive a 2 seater open top vehicle for commuting or pleasure but may on other occasions need the space or versatility of an estate car, hatchback or MPV to transport goods, shopping or other more passengers. At the moment people require such different vehicles have to purchase more than one motor vehicle.

SUMMARY OF THE INVENTION

It is an object of this invention to provide a motor vehicle that can be converted between one style of motor vehicle and another style of motor vehicle in an economical and simple manner.

According to the invention there is provided a motor vehicle having a body structure including a multi-piece roof structure having a number of roof members reversibly moveable by respective stowage mechanisms between raised and stowed positions, the arrangement being such that, when all of the roof members are in their respective raised positions, a two box motor vehicle having an engine compartment and a combined passenger and luggage compartment having at least two rows of seats including a front row and a rear row is formed and, when at least one of the roof members is moved into its respective stowed position, an alternative style of motor vehicle is formed wherein the multi-piece roof structure includes a rear roof member which, when in the stowed position, is located between two of the at least two rows of seats.

The motor vehicle may have two rows of seats comprising a front row which includes a seat for a driver of the motor vehicle and a rear row which includes one or more seats for passengers of the motor vehicle and the rear roof member, when in the stowed position, is located between the front and rear rows of seats so as to at least partially obscure the rear row of seats from view.

The multi-piece roof structure may comprise of front and rear roof members and, when the rear roof member is moved to the stowed position and the front roof member is also moved to the stowed position, a two seat open top style of motor vehicle may be formed.

The multi-piece roof structure may comprise of front and rear roof members and, when the rear roof member is moved to the stowed position and the front roof member is retained in the raised position, a pick up style of motor vehicle may be formed.

The multi-piece roof structure may comprise of front and rear roof members, the area behind the rear row of seats forms a luggage compartment and the front roof, when in the stowed position, may form a cover for the luggage compartment.

The rear row of seats may include at least one foldable backrest which can be selectively folded forward to increase the size of the luggage compartment.

The multi-piece roof structure may comprise of front and rear roof members and the stowage mechanism for the front roof member may comprise a pair of elongate arms attached to each side of the front roof portion and a drive means driveably attached to at least one of the pair of arms on each side of the motor vehicle to move the arms between raised and lowered positions.

Each of the pair of arms on each side of the motor vehicle may be substantially "S" shaped so as to prevent interference with ingress and egress from the motor vehicle when the front roof is in the raised position.

Each of the pair of arms on each side of the motor vehicle may be pivotally connected at a lower end to part of the body structure of the motor vehicle and may be pivotally connected at an upper end to the front roof structure.

Preferably, the positioning and lengths of the two arms may be such that the orientation of the front roof member may be maintained substantially the same during movement from the raised position to the lowered position.

In both the raised and stowed positions the front roof member may be orientated so as to be positioned substantially horizontally on the motor vehicle when the motor vehicle is resting on a horizontal surface.

To move the rear roof member from the raised position to the lowered position the rear roof member may be rotated forward, moved forwardly and lowered to the stowed position.

To move the rear roof member from the raised position to the lowered position the rear roof member may be moved rearwardly, rotated forward, moved forwardly and lowered to the stowed position.

The motor vehicle may further comprise a moveable flap on each side of the motor vehicle and, to permit the rear roof member to be lowered into its stowed position, both of the flaps are moved from respective resting positions into respective raised positions.

During stowage of the front and rear roof members, each of the flaps may be moved back into its original resting position before the front roof member reaches its stowed position.

Each of the flaps may be automatically moved during lowering of the roof member into its stowed position by a motor.

The motor vehicle may further comprise a moveable side window located adjacent each of the flaps and each flap may carry a seal for cooperation with an inner side of the adjacent side window when the window is raised and the flap is in its resting position.

The motor vehicle may have at least one moveable window located on each side of the passenger compartment and the front roof member may include a window seal for engagement with an upper edge of the or each adjacent window when the front roof member and the or each adjacent window are in their respective raised positions.

When the front roof is in the stowed position, the window seals on each side of the front roof member may be used to form a seal between the front roof member and the body structure of the motor vehicle.

When the front roof is in the stowed position, each of the flaps may include a lip which is arranged to engage with one of the window seals so as to form a seal therebetween.

To move the front roof member from the raised position to the stowed position the rear roof may be first moved from the raised position towards the stowed position.

To move the rear roof member from the stowed position to the raised position the front roof member may be first moved from the stowed position towards the raised position.

According to a second aspect of the invention there is provided a method for converting a two box motor vehicle having an engine compartment, a combined passenger and luggage compartment in which is located at least two rows of seats including a front row and a rear row and a multi-piece moveable roof structure including a rear roof member into an alternative style of motor vehicle the method comprising moving at least the rear roof member from a raised position, in which in combination with one or more other roof members it forms a cover for the combined passenger and luggage compartment, to a stowed position in which the rear roof member is positioned between two of the at least two rows of seats.

When only the rear roof member is moved from the raised position to the stowed position, the two box motor vehicle may be converted into a pick-up style of motor vehicle.

The multi-piece roof structure may comprise of front and rear roof members and the method may comprise moving the rear roof member to the stowed position in which the rear roof member is positioned between two of the at least two rows of seats and moving the front roof member from a raised position to a stowed position to convert the two box motor vehicle into an open top style of motor vehicle.

The motor vehicle may only have a front row and a rear row of seats and the rear roof in the stowed position may be positioned between the front and rear rows of seats so as to at least partially obscure from view the rear row of seats.

The multi-piece roof structure may comprise of front and rear roof members and the method may further comprise moving the rear roof member from its raised position towards its stowed position before the front roof is moved from its raised position to its lowered position.

The method may further comprise raising the front roof member from its stowed position towards its raised position before the rear roof is raised from its stowed position.

The motor vehicle may further comprise a moveable flap on each side of the motor vehicle and the method may further comprise moving both of the flaps from respective resting positions into respective raised positions in order to permit the rear roof member to be lowered into its stowed position.

The motor vehicle may further comprise one or more moveable side windows on each side of the passenger compartment and the method may further comprise lowering the or each side window on both sides of the passenger compartment before starting to move the rear roof.

The multi-piece roof structure may comprise of front and rear roof members and the method may further comprise moving the rear roof member rearwards to disengage it from the front roof member to permit the rear roof to be moved to the stowed position.

The method may further comprise rotating the rear roof forwardly so that the front edge of the rear roof member lies below the rear edge of the front roof member, moving the rear roof member forwardly so that it passes under the rear edge of the front roof member and, when the forward motion is substantially complete, lowering the rear roof member along an inclined plane into the stowed position.

BRIEF DESCRIPTION OF THE DRAWINGS

The invention will now be described by way of example with reference to the accompanying drawing of which:

FIG. 30a is a scrap cross-section through the access flap shown in FIGS. 29 and 30 showing the flap in a closed position;

DETAILED DESCRIPTION OF THE PREFERRED EMBODIMENTS

With particular reference to FIGS. 1 to 13 there is shown a two box motor vehicle 1 which in this case is in the form or style of a hatchback motor vehicle but could also be of an MPV or estate vehicle. It will be appreciated by those skilled in the art that a two box vehicle is one with an engine compartment and a passenger compartment with no fixed bulkhead between the passenger compartment and a luggage storage area. The luggage storage area is formed as part of the passenger compartment and the front or rear seats depending upon the number of rows of seats are used as a separator.

Figure 1:
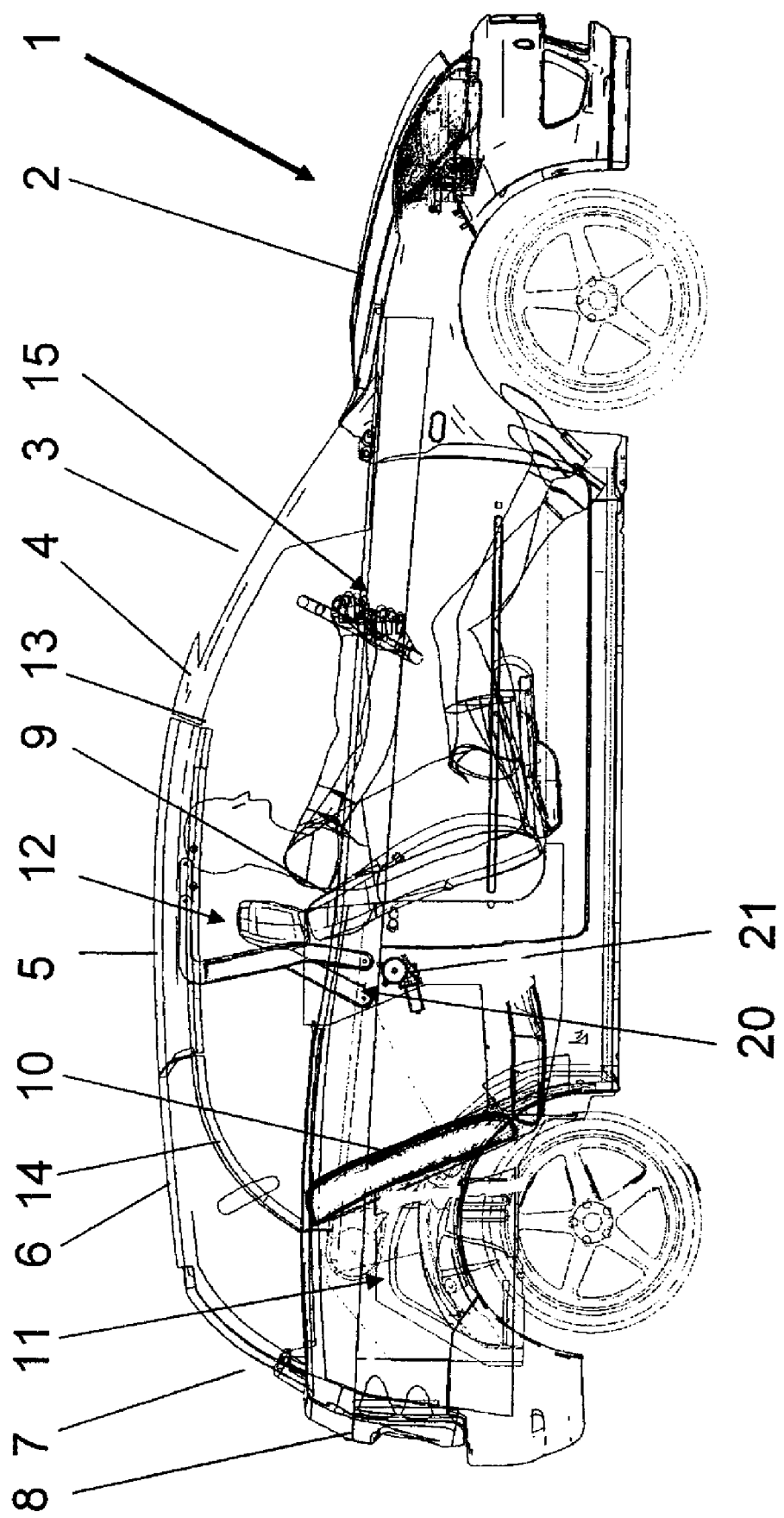
FIG. 1 is a side view of a two box motor vehicle according to the invention which is shown partially transparent so that features normally not visible can be seen, the motor vehicle has front and rear roof members both of which are shown in their fully raised positions.

The motor vehicle 1 has a body structure including a bonnet 2 located near to a front end of the vehicle 1, a windscreen 3 extending upwardly and rearwardly away from the bonnet 2 and having at its upper edge a transversely extending crossrail 4 which is connected to the main lower body structure of the motor vehicle by a pair of front support pillars or "A" posts. The vehicle has a two piece rigid moveable roof structure comprised of a front roof member 5 having a front edge for abutment against the transverse cross-rail 4 when the front roof member 5 is in the raised position (as shown in FIG. 1) and a rear roof member 6 having a front edge for sealing engagement with a rear edge of the front roof member 5 when the front and rear roof members 5 and 6 are both in their respective raised positions (as shown in FIG. 1) and a lower edge for sealing abutment with the lower body structure of the motor vehicle 1 when the rear roof is in its raised position.

The lower body structure of the motor vehicle 1 is that part of the body structure which lies on or below a waistline 15 of the motor vehicle 1. Above the waistline 15 is the upper body structure which is primarily comprised of any windows fitted to the motor vehicle 1 and the roof structure of the motor vehicle 1. The upper body structure is therefore often referred to as the "glasshouse" of a vehicle.

The rear roof member 6 has a substantially flat major surface and two downwardly depending side portions which are used to connect the flat surface to the lower body structure of the vehicle 1.

The front roof member 5 is in the form of a substantially flat panel which reinforcements along each side and is arranged substantially horizontally when the vehicle 1 is resting upon a horizontal surface.

The vehicle 1 has a front moveable side window 13 and a rear moveable side window 14 fitted on each side of the vehicle 1 to allow a driver or any passengers to see out of the sides of a passenger compartment 12. The moveable side windows 13, 14 are engageable at their upper ends with seals attached to the side edges of the front and rear roof members 5 and 6 when the respective windows 13, 14 are raised and the roof members 5, 6 are in the raised positions shown in FIG. 1.

The rear roof 6 has an upper tailgate 7 connected at an upper end thereof by means of hinges (not shown) to the rear roof member 6. In this case the rear tailgate 7 is made from glass but it will be appreciated that it could be constructed as a peripheral frame with a glass panel located therein.

A lower tailgate 8 is connected at a lower end by means of hinges (not shown) to the lower body structure. The upper and lower tailgates 7 and 8 form in combination a split tailgate assembly which is useable when the motor vehicle is configured as a hatchback vehicle to gain access to a luggage area 11 located in the rear of the passenger compartment 12 of the motor vehicle 1. Access to the luggage area 11 can be gained by either raising the upper tailgate 7 or by opening both of the tailgates 7, 8. The vehicle 1 has two rows of seats located in the passenger and luggage compartment 12 (which is sometimes referred to as a combined luggage and passenger compartment), there is a front row of seats 9 located towards the front of the passenger compartment 12 including a seat for a driver of the vehicle 1 and a rear row of seats 10 including a number of passenger seats.

The backrests of the seats forming the rear row 10 are used to separate the luggage area 11 from the rest of the passenger compartment 12. As is well known in the art, the backrests of one or more of the rear row of seats 10 can be folded forward to increase the luggage carrying capacity of the vehicle 1.

A stowage mechanism 20 for the front roof member 5 is shown to include an electric motor driveably connected to one of two arms 22, 23 described in greater detail hereinafter.

The vehicle 1 is shown in FIG. 1 with both of the roof members 5, 6 in their fully raised positions so as to produce a hatchback style of motor vehicle but the roof members 5, 6 are moveable from these raised positions to respective stowed positions to form further alternative styles of motor vehicle.

The process of transformation from the hatchback style to an open top or convertible style of motor vehicle will now be described with reference to FIGS. 2 to 13 but it will be appreciated that the process is reversible so that the vehicle can also be converted back from a convertible to a hatchback.

Figure 2:
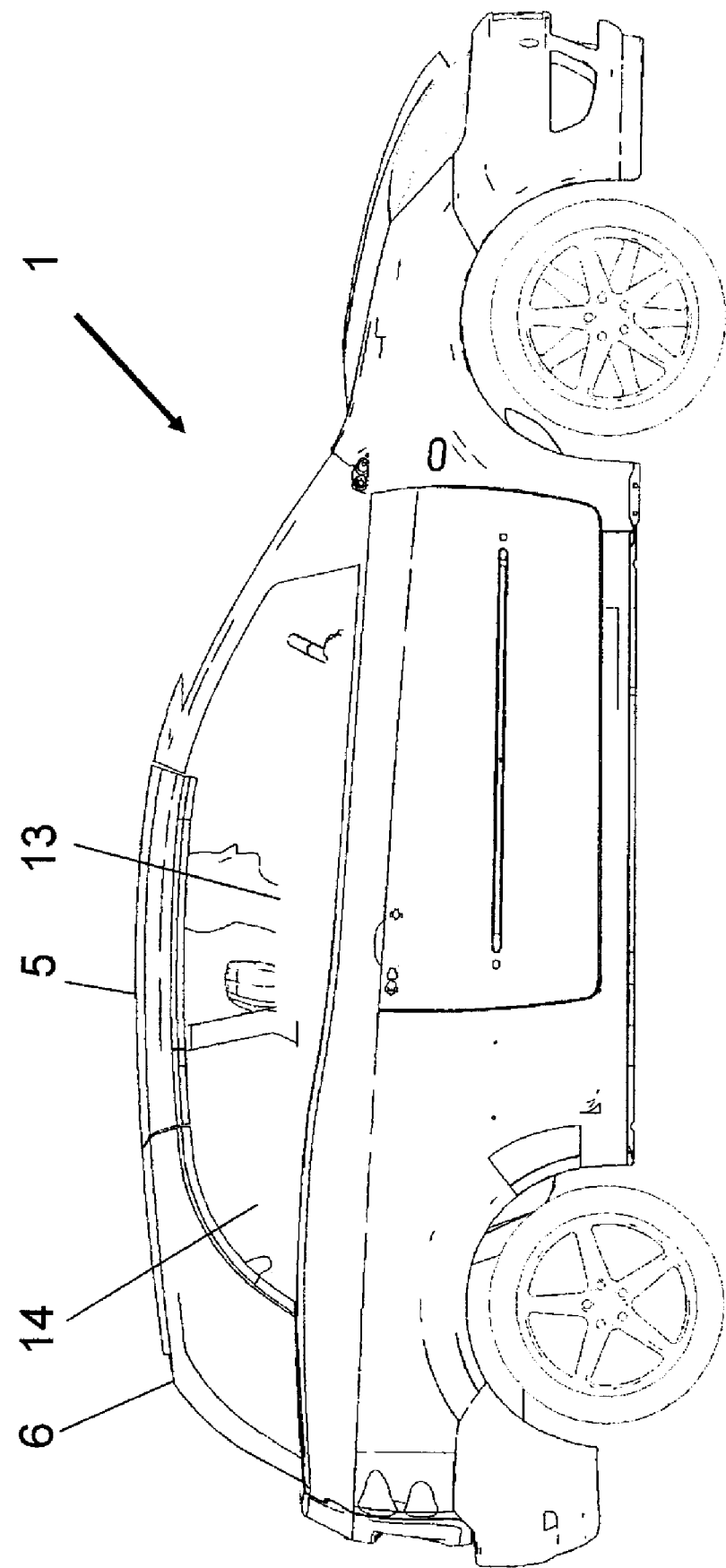
FIG. 2 is side view of the motor vehicle shown in FIG. 1 as it would normally appear when viewed from the side showing the first step in a transformation process from a two box style to a convertible style of motor vehicle.

In FIG. 2 the first step of the transformation process is shown partially completed with the front and rear side windows 13 and 14 partially lowered into the lower body structure of the vehicle 1. When fully complete the front and side windows 13 and 14 are fully retracted into the lower body structure.

Figure 3:
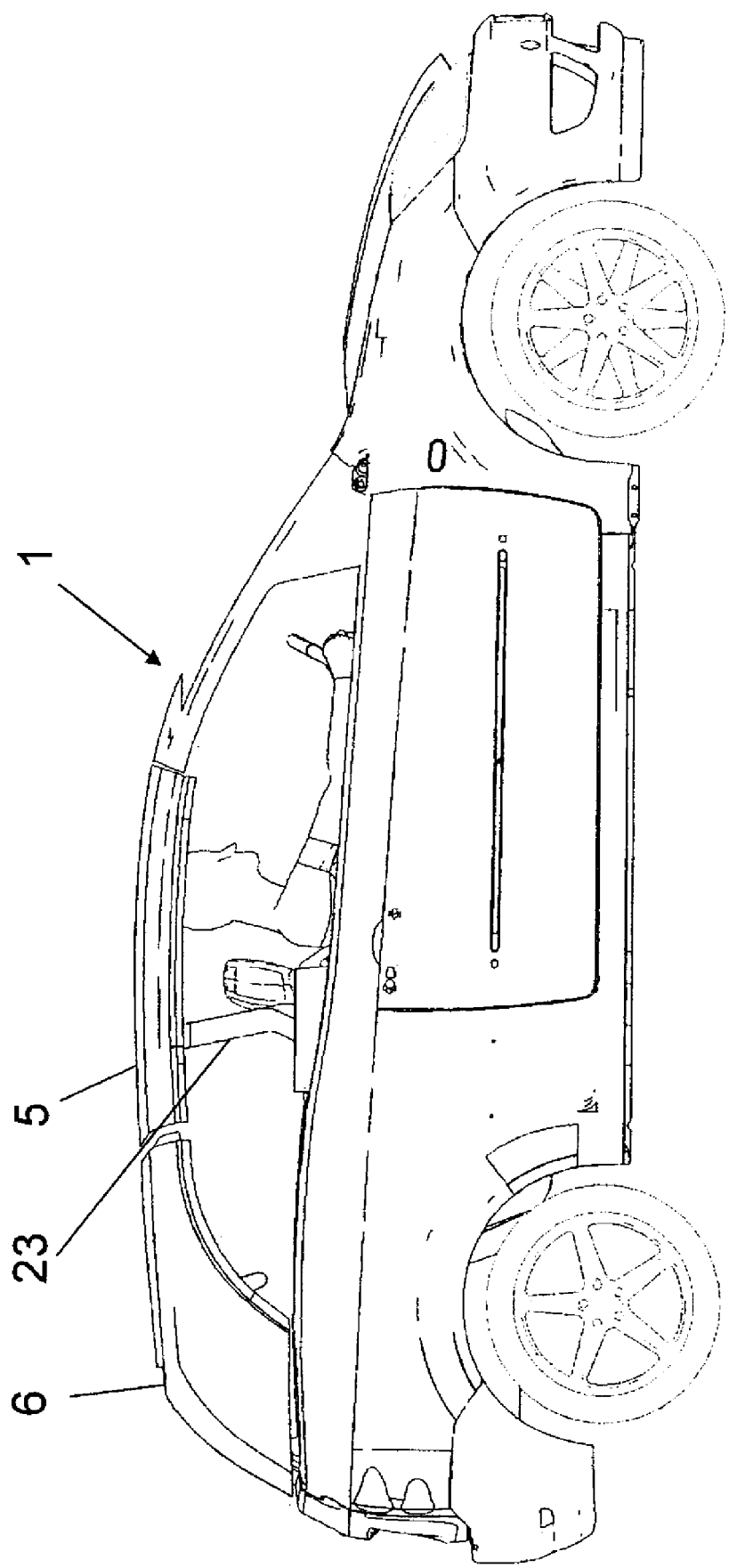
FIG. 3 is a side view similar to FIG. 2 but showing the next step in the transformation process.

In FIG. 3 the next step of the transformation process is shown in which the rear roof member 6 is slid rearwardly away from the front roof member 5 so as to disengage the front edge of the rear roof member 6 from the rear edge of the front roof member 5. During this rearward movement the rear roof 6 is arranged to be moved slightly upwardly as it traverses rearwardly so as to reduce the loading on any seals (not shown) positioned between the rear roof 6 and the adjacent lower body structure. That is to say the rear roof 6 moves primarily rearwardly along an upwardly inclined plane during this step.

Figure 4:
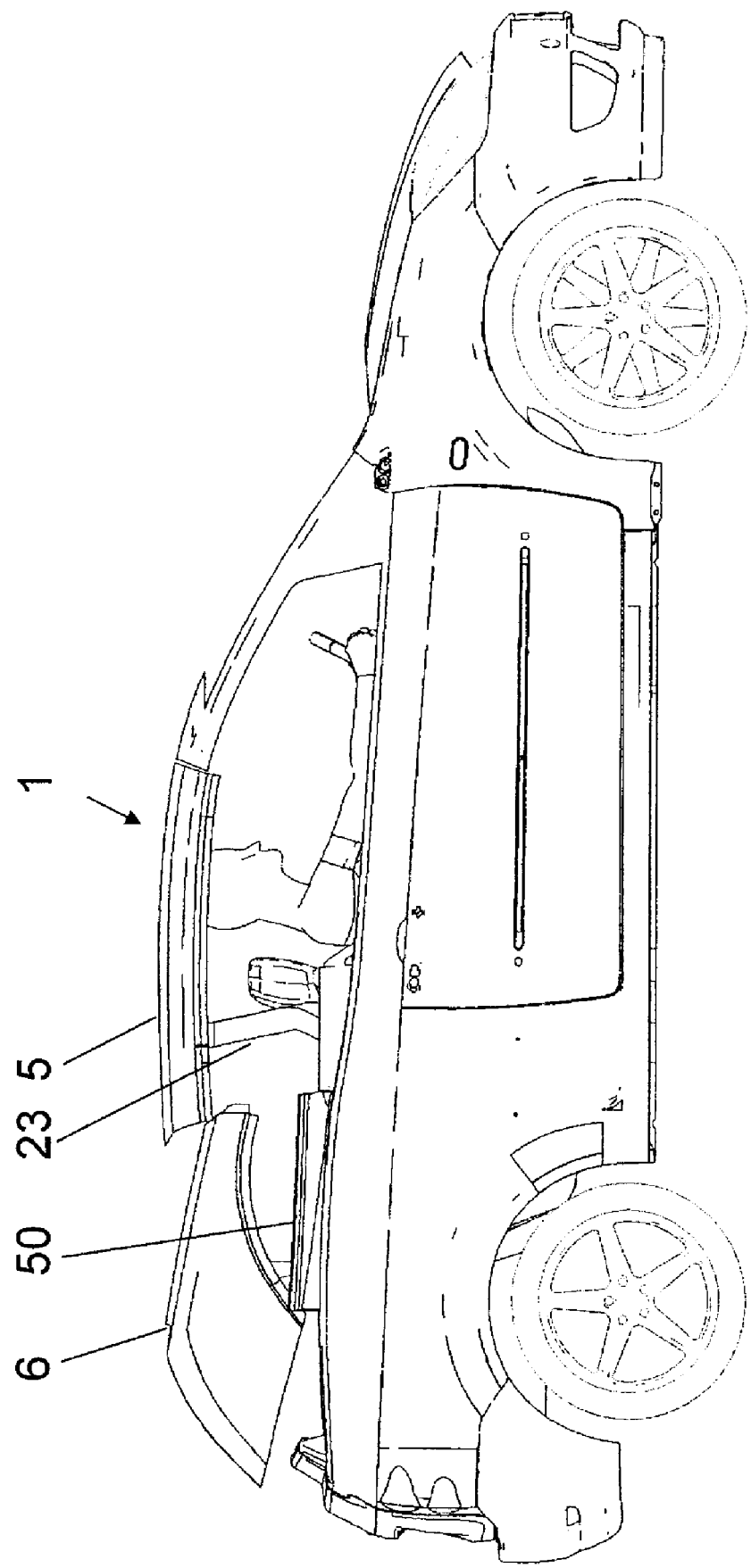
FIG. 4 is a side view similar to FIG. 3 but showing the next step in the transformation process.

In FIG. 4 the next step of the transformation process is shown in which an access flap 50 is lifted on each side of the vehicle 1 from a closed position to a raised position. The access flaps 50 are positioned substantially on the waistline 15 of the vehicle 1 and need to be raised to allow the rear roof member 6 to begin to rotate forwardly.

The rear roof member 6 then begins to rotate forwardly so that the front edge of the rear roof member 6 is dropped below the height of the rear edge of the front roof member 5.

Figure 5:
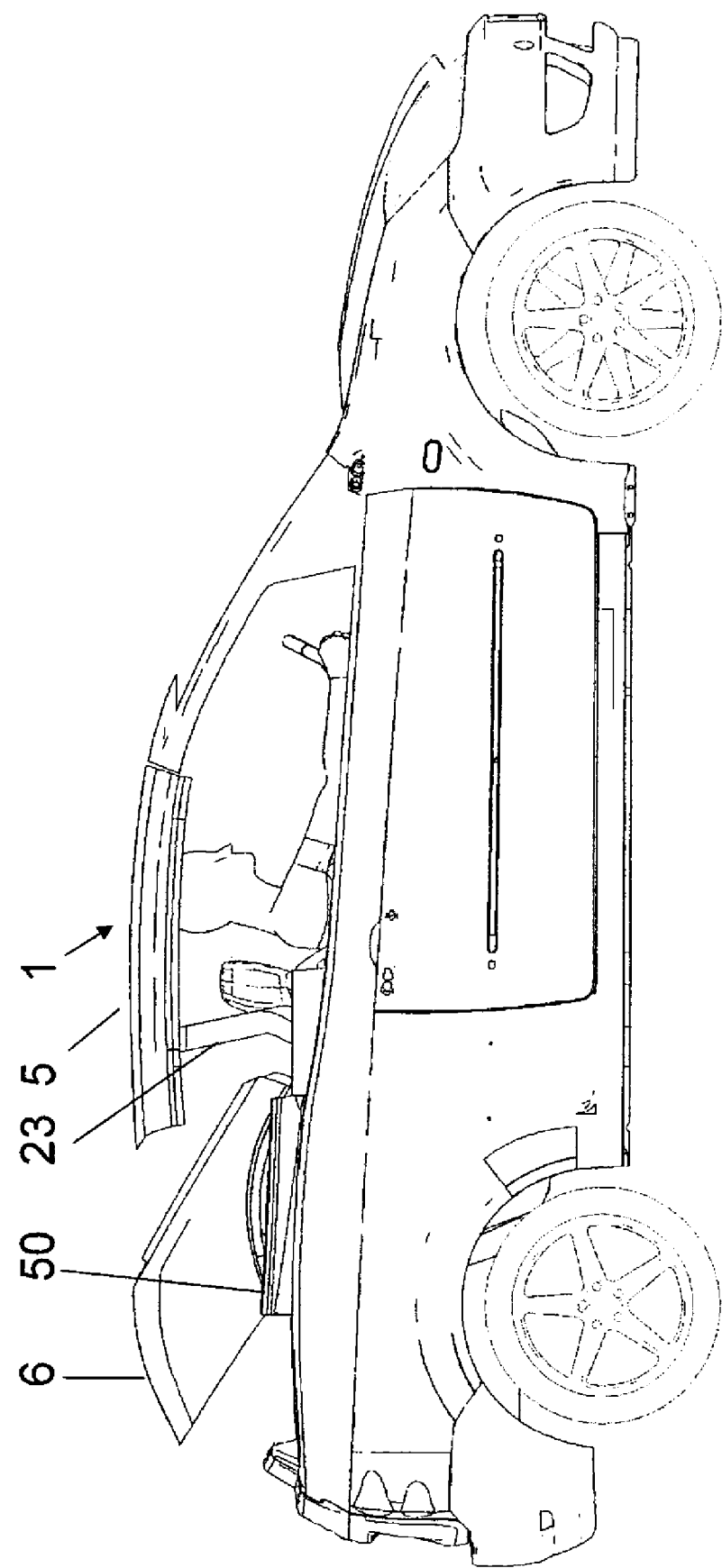
FIG. 5 is a side view similar to FIG. 4 but showing the next step in the transformation process.

In FIG. 5 the next step of the transformation process is shown in which the rear roof member 6 is rotated further forwardly.

The rear roof member 6 is then moved forwardly. The motion of the rear roof member 6 is synchronised or arranged such that the front edge of the rear roof member 6 passes under the rear edge of the front roof member 5. During this step the rear roof member 6 is moved forwardly and downwardly along a downwardly inclined plane. In this case the downwardly inclined plane lies above and parallel to the upwardly inclined plane along which the rear roof member 6 was initially moved rearwardly along. However, the downwardly inclined plane need not be arranged parallel to the upwardly inclined plane.

Figure 6:
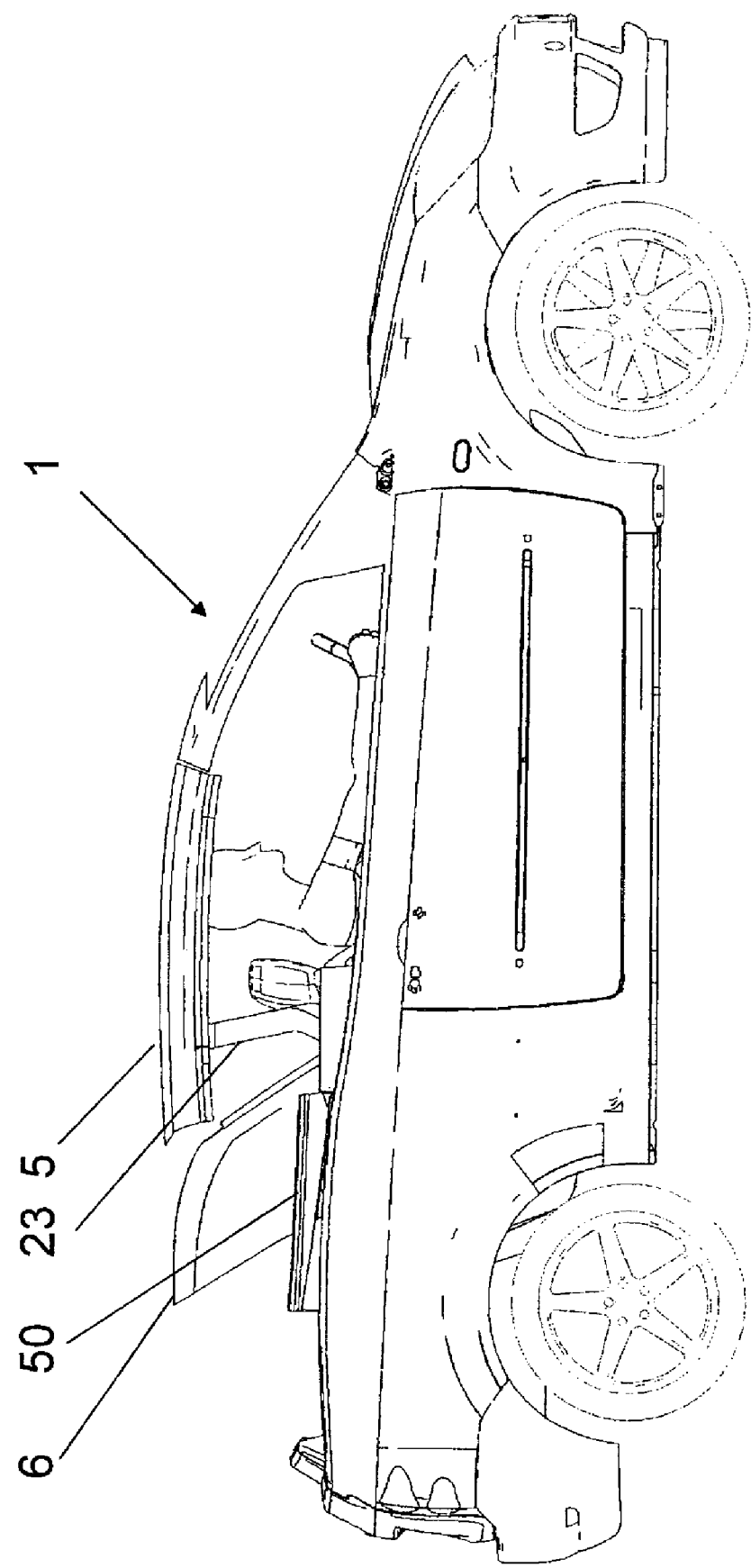
FIG. 6 is a side view similar to FIG. 5 but showing the next step in the transformation process.

In FIG. 6 the next step of the transformation process is shown. The forward rotation of the rear roof member 6 is complete and the forward motion of the rear roof member 6 is complete so that the rear roof member 6 is now positioned in a vertically inclined orientation in preparation for lowering into the passenger compartment 12. That is to say the relatively flat major surface of the rear roof member 6 is positioned at an angle that is less than 45 degrees to the vertical.

Figure 7:
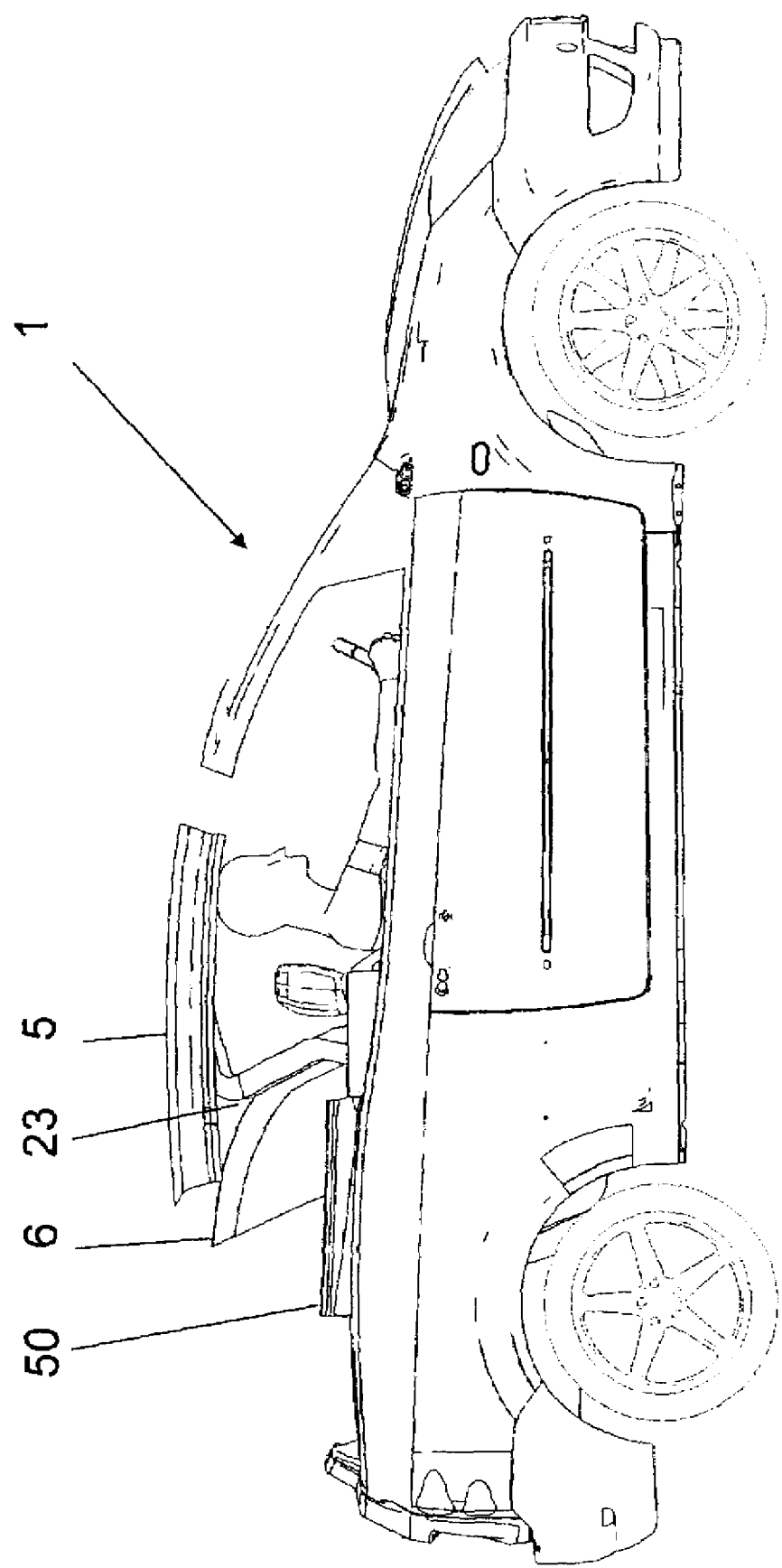
FIG. 7 is a side view similar to FIG. 6 but showing the next step in the transformation process.

In FIG. 7 the next step of the transformation process is shown in which the rear roof member 6 transitions downwardly along a vertically inclined plane and the front roof member 5 begins to move from its raised position towards its stowed position. It will be noted that the front roof member 5 is retained in substantially the same orientation at all times so that it remains substantially horizontal and passes over the partially stowed rear roof member 6.

Figure 8:
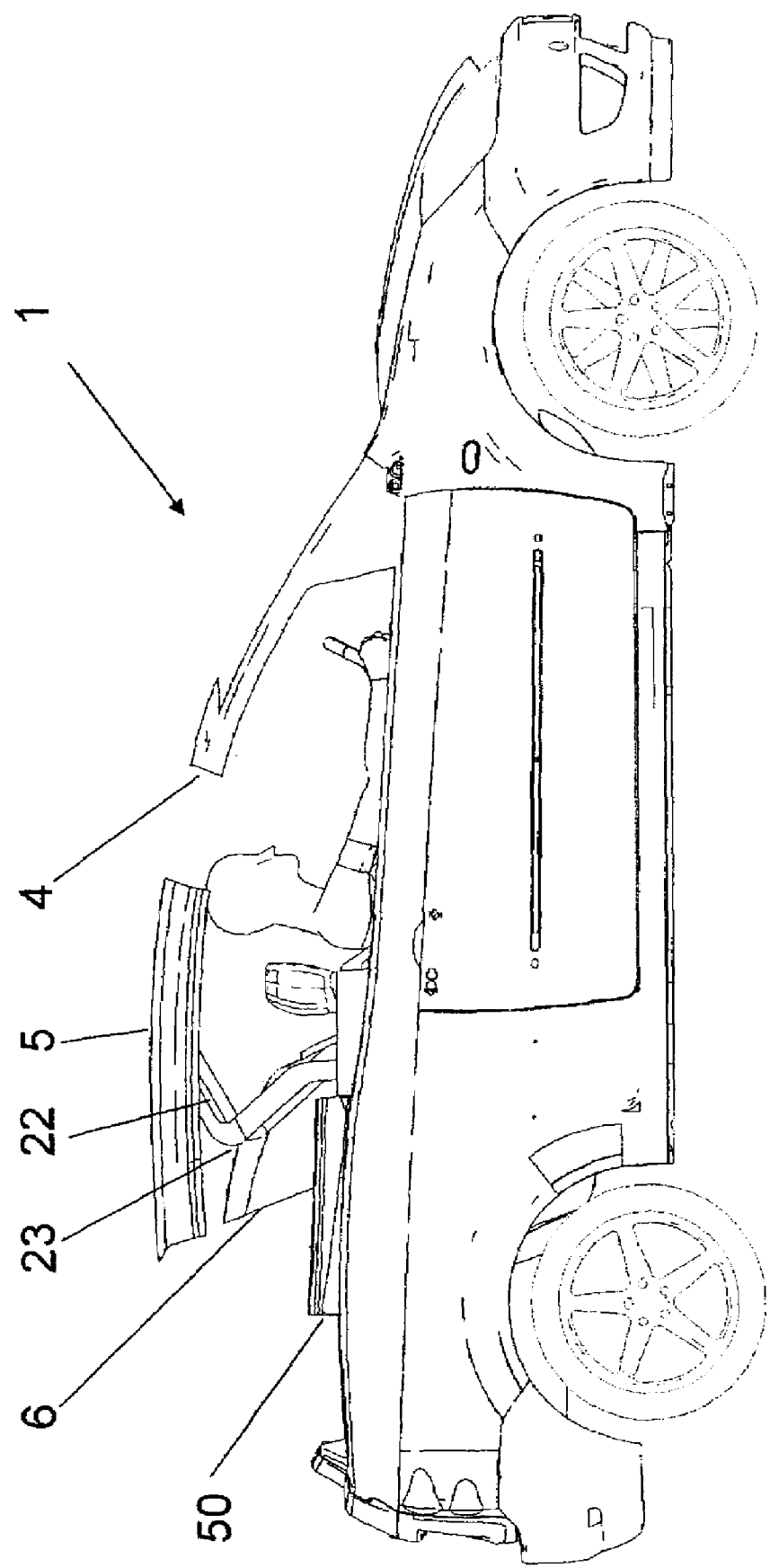
FIG. 8 is a side view similar to FIG. 7 but showing the next step in the transformation process.

In FIG. 8 the next step of the transformation process is shown in which the rear roof continues to transition downwardly and the front roof member 5 continues to be moved rearwardly along an arc or curved path defined by the two arms 22, 23 used to support it. It will be appreciated that there are two more arms on the opposite side of the front roof member 5 which move in an identical manner to the two arms 22, 23 shown.

Figure 9:
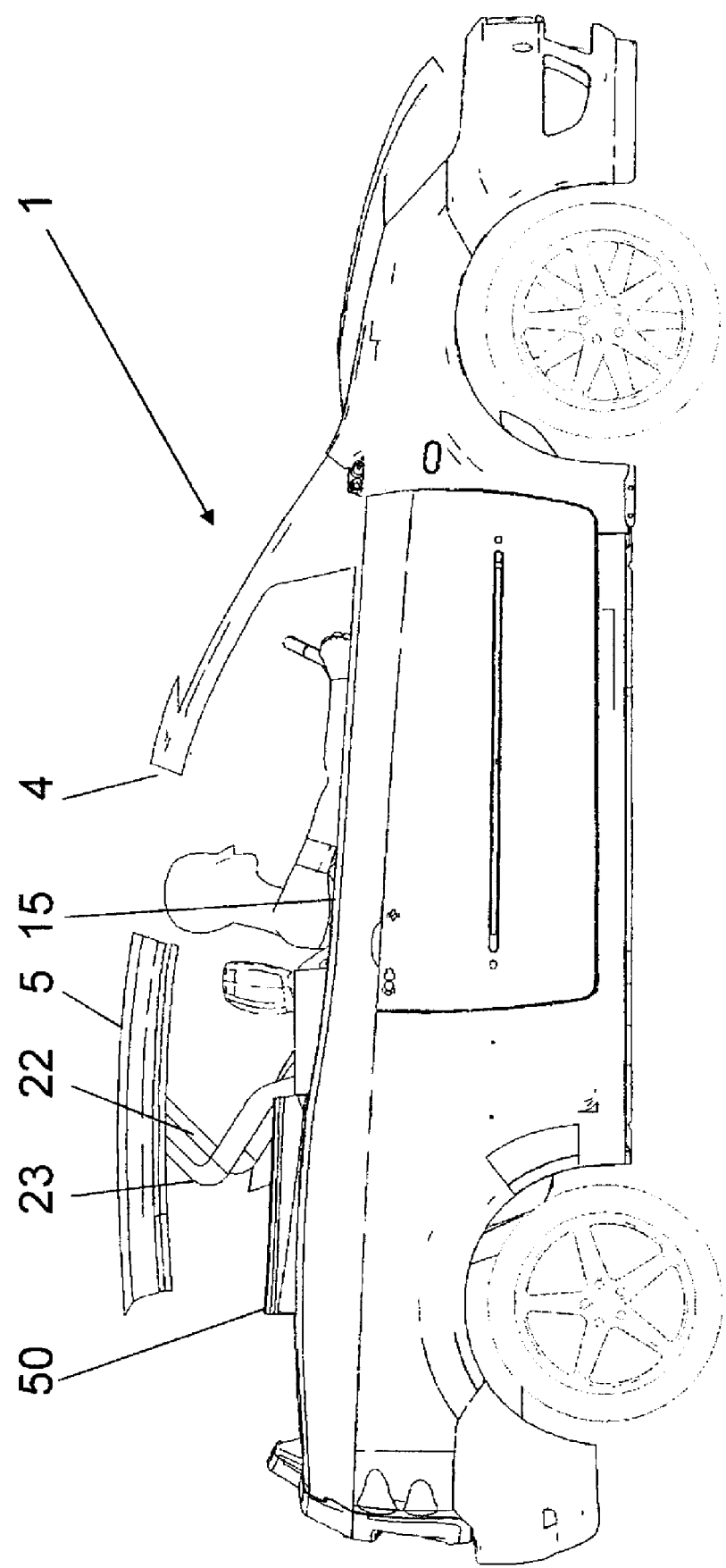
FIG. 9 is a side view similar to FIG. 8 but showing the next step in the transformation process.

In FIG. 9 the next step of the transformation process is a continuation of that described with respect to FIG. 8.

Figure 10:
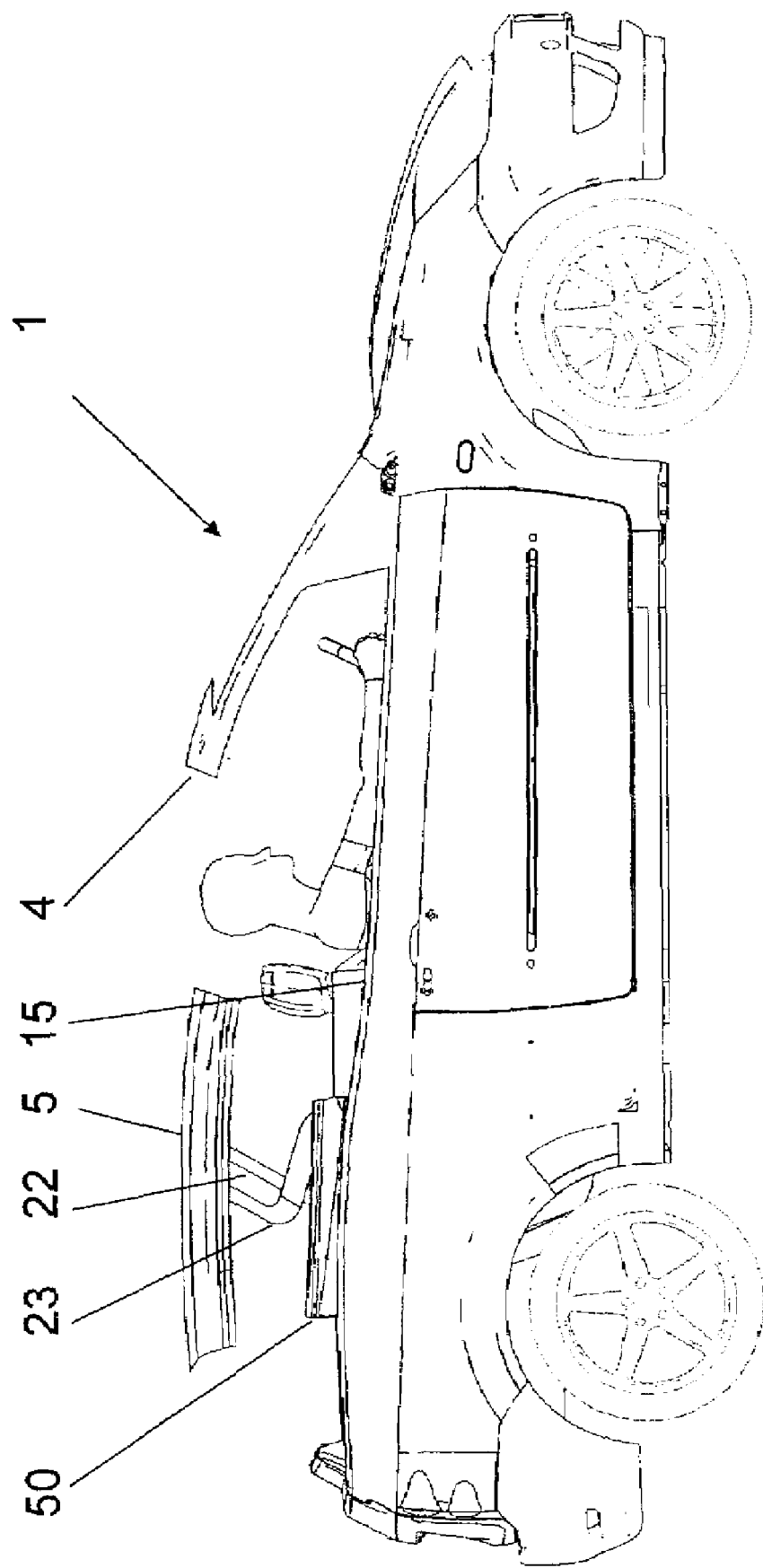
FIG. 10 is a side view similar to FIG. 9 but showing the next step in the transformation process.

In FIG. 10 the rear roof member has reached its fully stowed position and is located within the passenger compartment behind the front row of seats 9. It will be seen that in this position it lies below the waistline 15 of the vehicle 1 and it will be appreciated that in this position it conceals the rear row of seats from view. It is advantageous to store the rear roof member 6 in this near vertical orientation behind the front row of seats because it takes up relatively little space when so stowed, protects the rear row of seats from the environment and, perhaps most importantly, does not occupy any of the luggage area of the vehicle 1 so that the original luggage carrying capacity of the vehicle 1 below the waistline 15 remains virtually the same.

Figure 11:
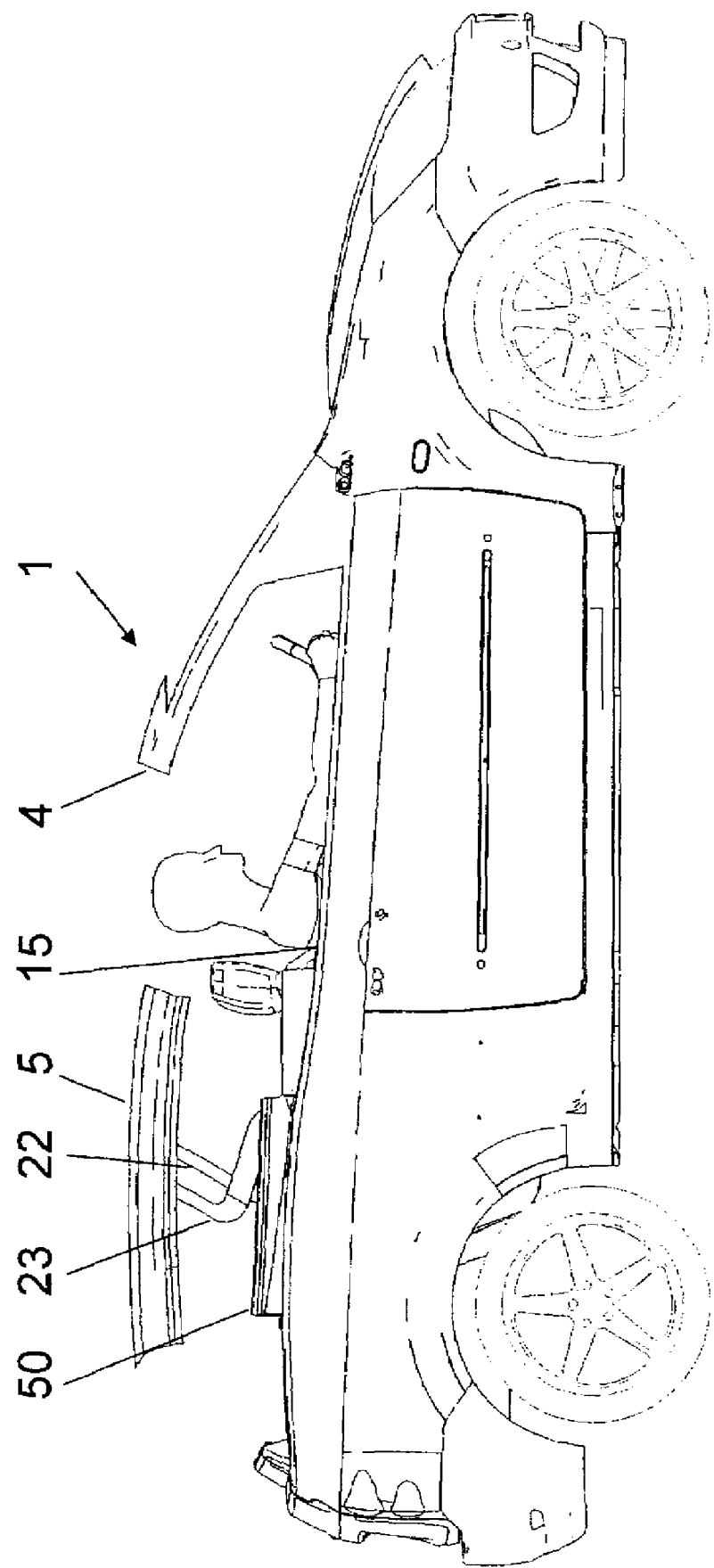
FIG. 11 is a side view similar to FIG. 10 but showing the next step in the transformation process.

In FIG. 11 the front roof member has virtually reached the rearward limit of its movement and now continues to move more or less downwardly although it still follows a curved path as defined by the two arms 22, 23.

Figure 12:
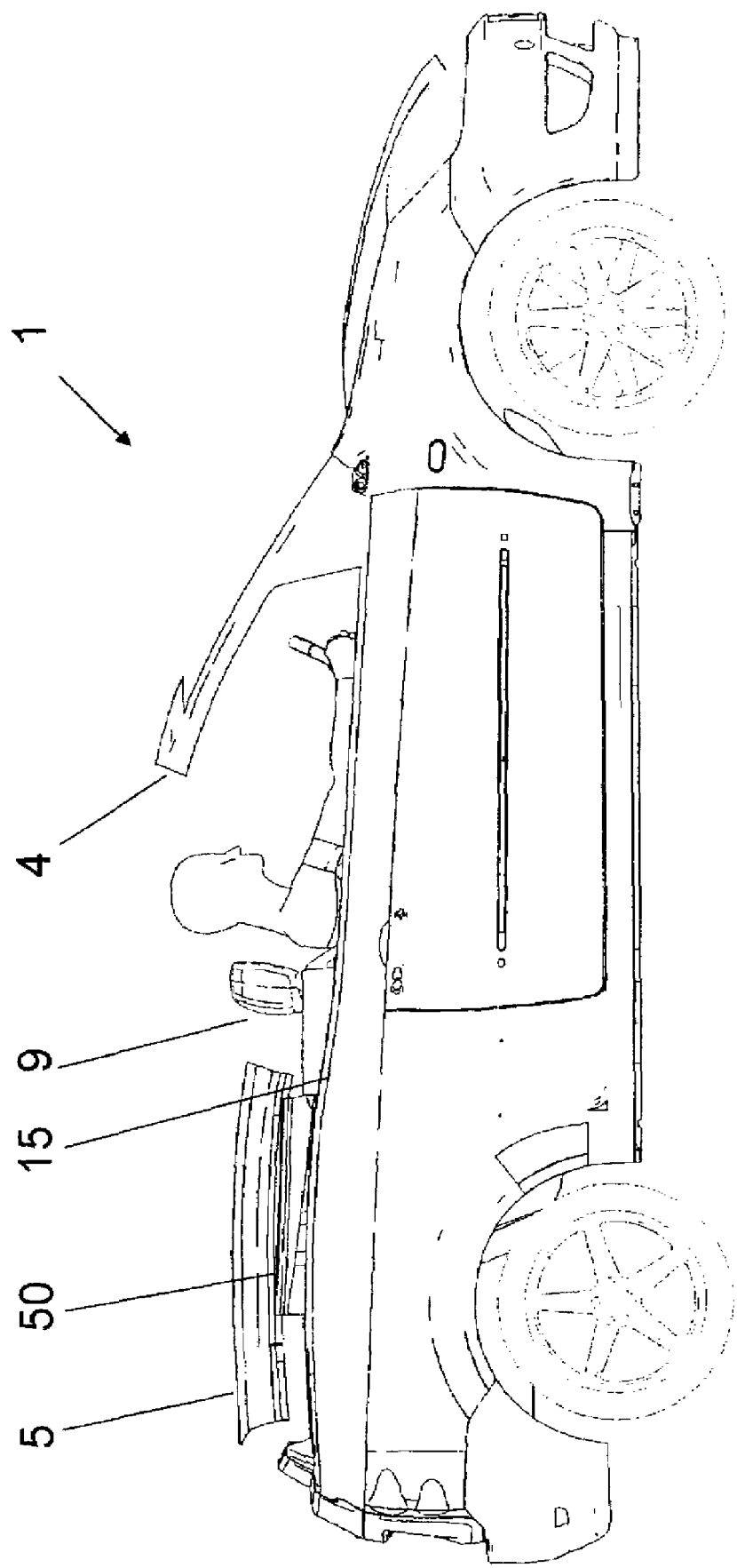
FIG. 12 is a side view similar to FIG. 11 but showing the next step in the transformation process.

In FIG. 12 the access flaps 50 start to move down just ahead of the lowering front roof member 5 so that they resume their original closed positions before the front roof member 5 reaches its stowed position. This is important because the seals on the side edges of the front roof member 5 which were previously used to seal the upper edges of the side windows 13, 14 are arranged to engage with a corresponding lips 55 on each of the access flaps 50. The lip 55 on one of the flaps 50 is shown on FIG. 30a.

Each of the access flaps 50 is important because without such a flap the rear roof member 6 could not be moved from its raised position to its stowed position because the side supports of the rear roof member 6 would contact the lower body structure. When the rear roof member 6 is in the fully raised position it lodges partially on each of the flaps 50 and so the flaps 50 cannot be raised until the rear roof member 6 has been moved rearwards but they are then raised to allow the rear roof member 6 to be moved forwardly to be stowed. Each of the flaps 50 is connected at one end by goose neck hinge arm 51 so that the flap 50 not only lifts up but also moves outwardly as it is raised.

The access flaps 50 are also useful because, as shown in FIG. 30a they are used to support an inner seal 52 for the rear side window 14, when the rear side window 14 is raised. An outer seal 53 is supported by an adjacent lower body panel 54 at a position at or close to the waistline 15 of the vehicle 1.

It will be appreciated that when the access flaps 50 are closed they lie to the inside of the adjacent rear side window 14 but when they are raised they are positioned to the outside of the rear side windows 14.

Figure 29A:
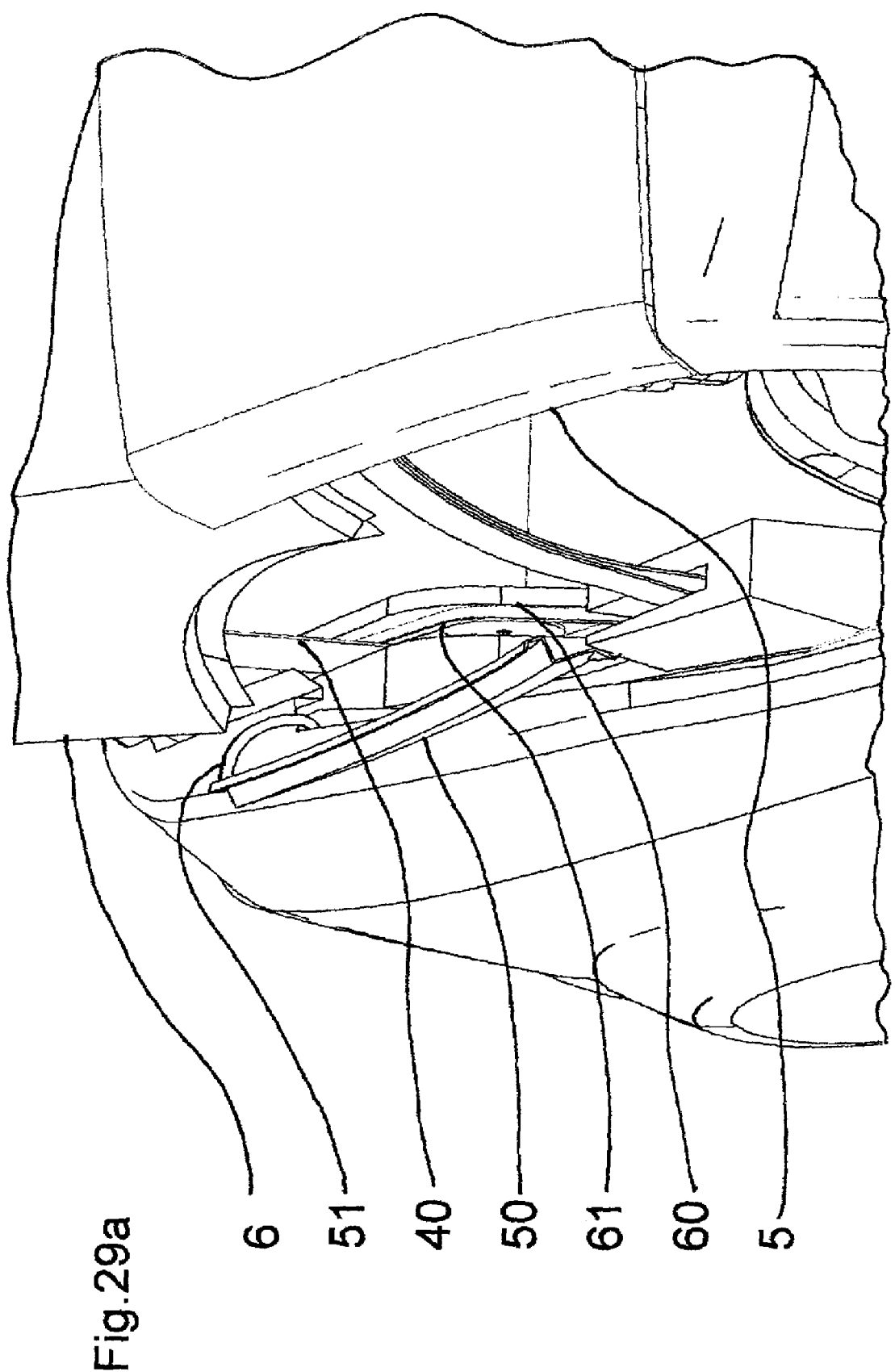
FIGS. 29a to 29c are scrap pictorial views of part of the motor vehicle showing a side access flap raised.
Figure 29B:
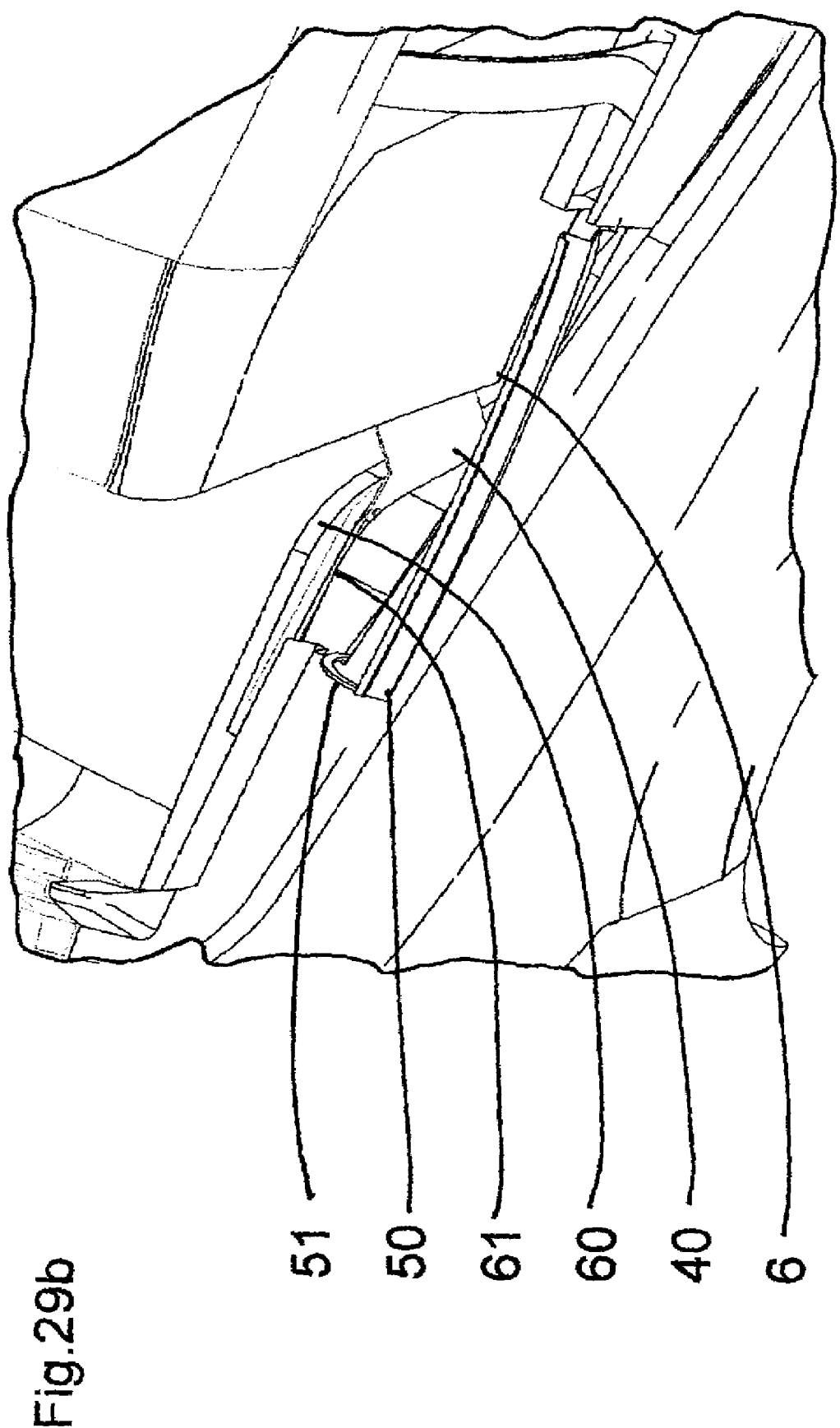
Figure 29C:
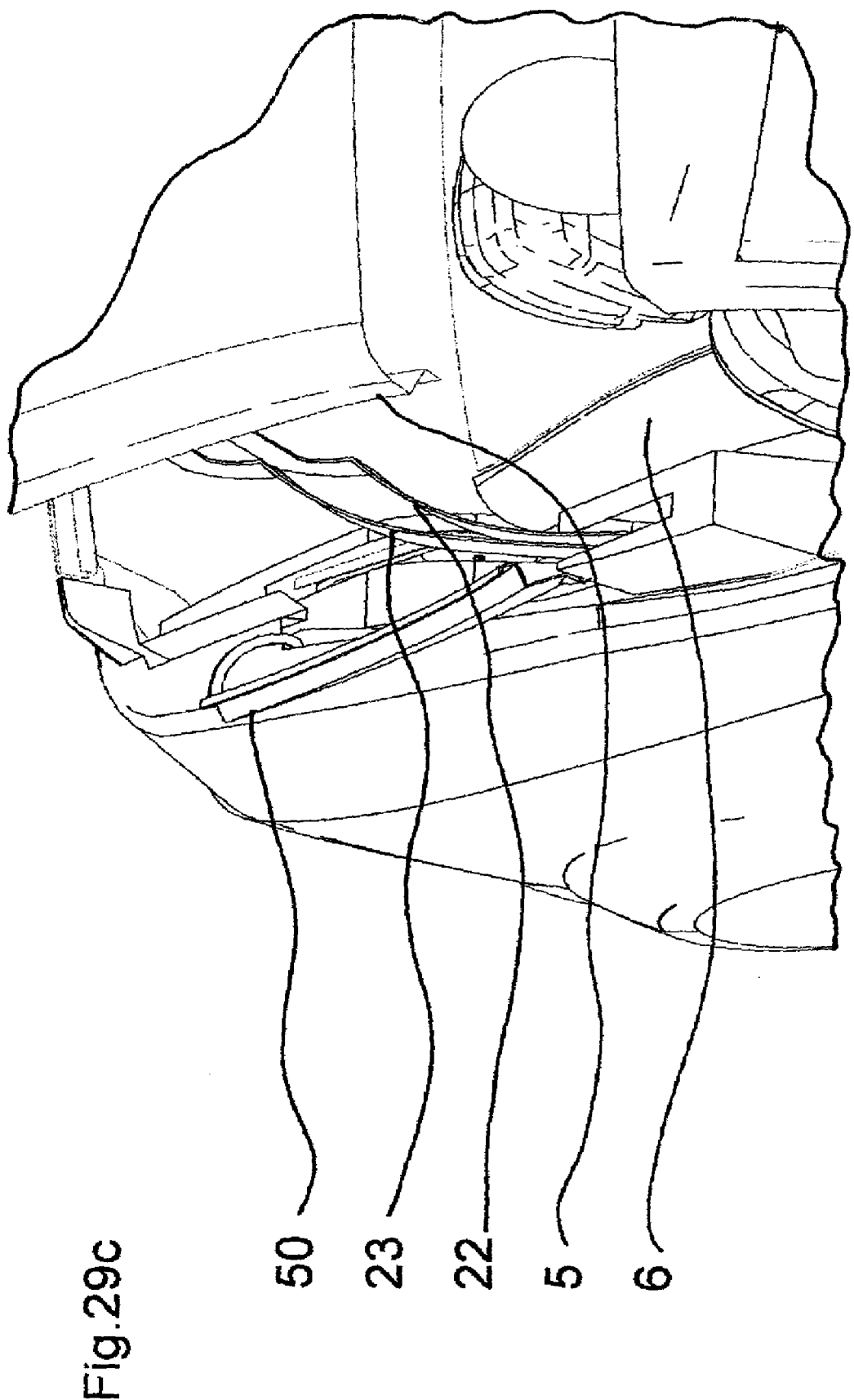
Figure 30:
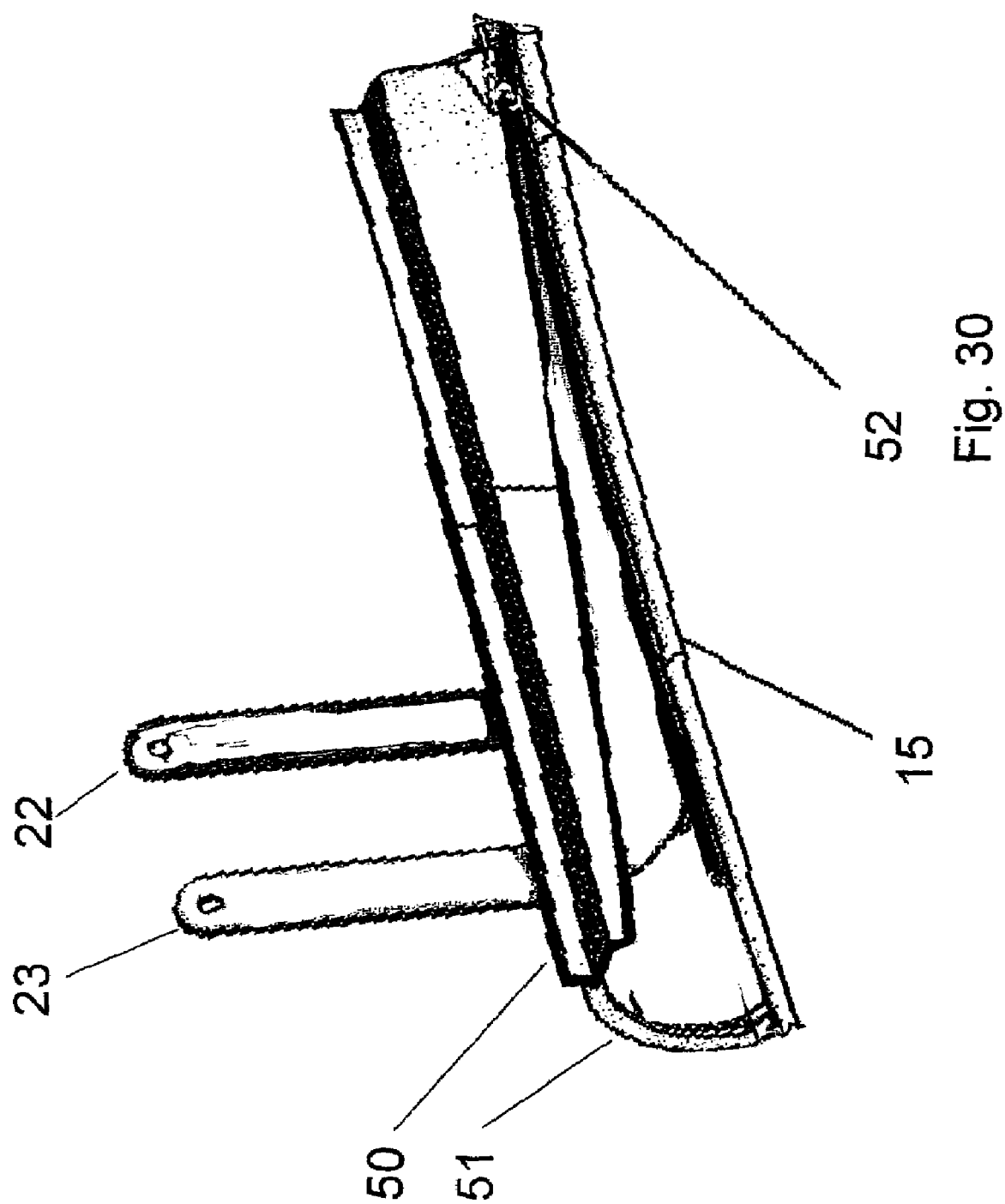
FIG. 30 is a pictorial view of the access flap shown on FIG. 28 when viewed from a reverse angle.

FIGS. 29a to 29c and the FIGS. 30 and 30a show further views of a right hand side access flap 50.

On FIGS. 29a to 29c it is shown that an interior trim panel 60 has an open ended slot 61 formed in it. This open ended slot 61 firstly allows the side supports and in particular a plate 40 used to connect the rear roof member 6 to a stowage mechanism to move from their raised positions and are then used to allow part of the rear arm 23 of the front roof mechanism 20 to pass into a recess (not shown) within the lower body structure so as to conceal it from view when the front roof member 5 is in its stowed position. The slot 61 is therefore advantageous because it permits not only the stowage of the rear roof member 6 to take place but also the stowage of the front roof member 5.

Figure 13:
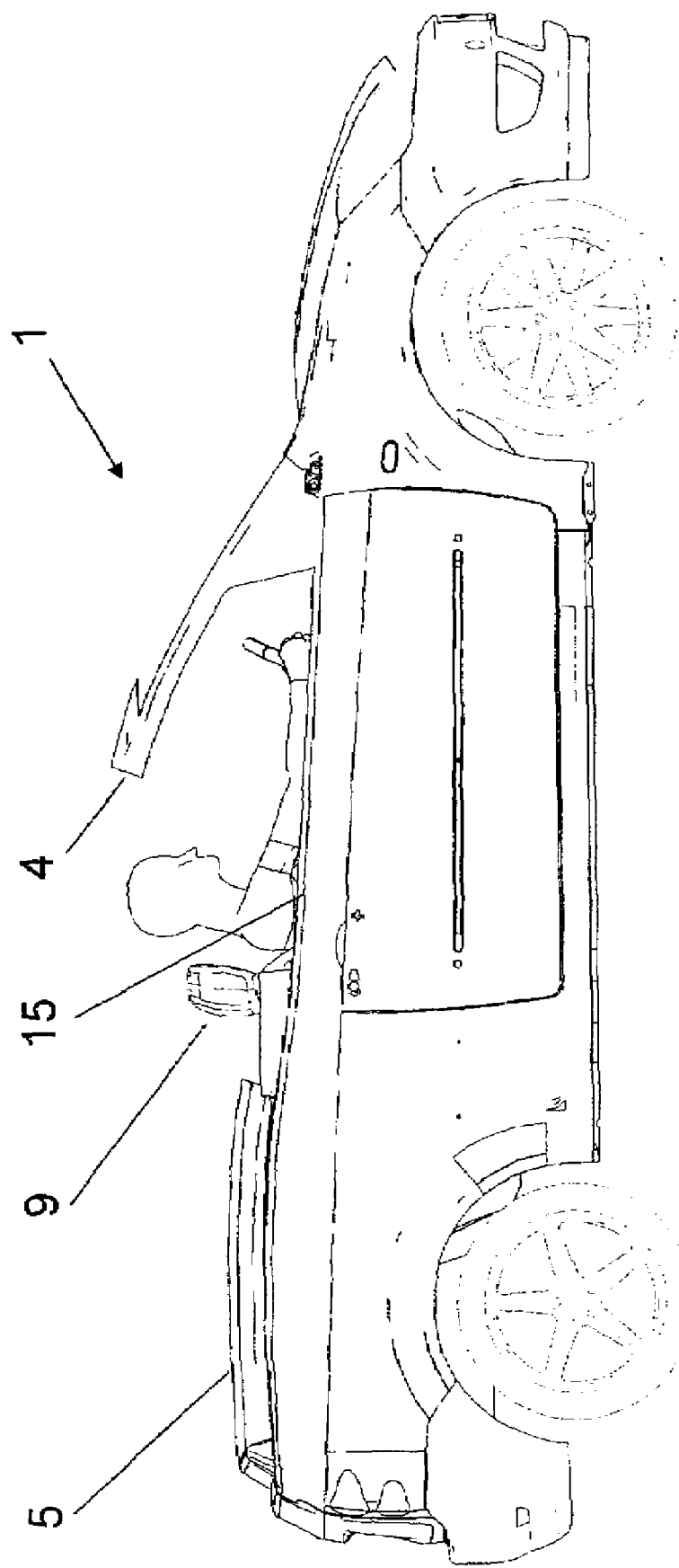
FIG. 13 is a side view similar to FIG. 12 but showing the final step in the transformation process in which the motor vehicle is in the style of a two seater convertible or open top vehicle with the front and rear roof members both shown in their fully stowed positions.

In FIG. 13 the transformation process is complete with the rear roof member 6 stowed behind the front row of seats 9 and the front roof member 5 stowed horizontally on the rear part of the lower body structure so as to form a rear deck covering the luggage area 11 of the vehicle 1. The vehicle 1 has been transformed from a conventional hatchback into a two seater convertible or open-top style of vehicle.

Figure 33:
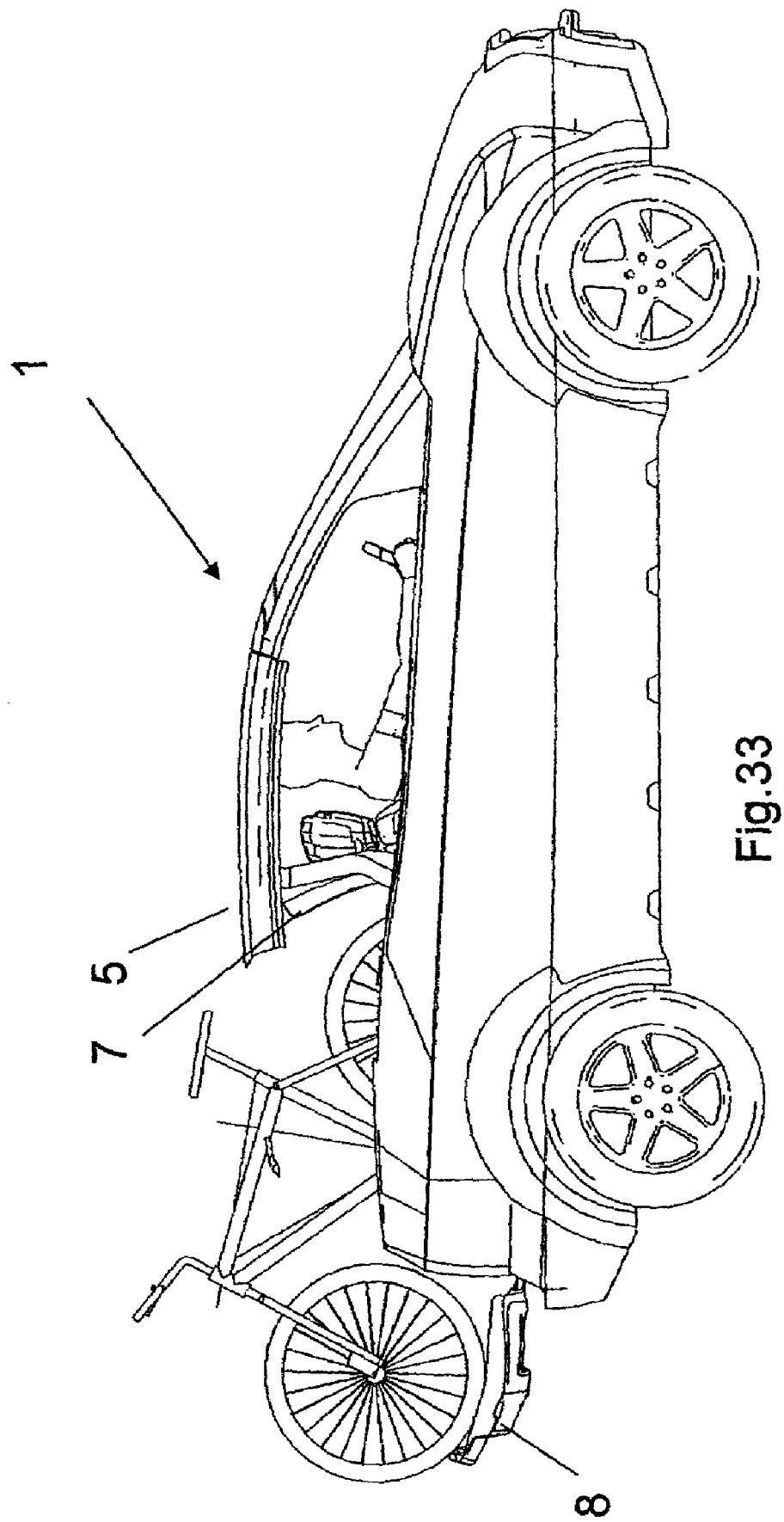
FIG. 33 is a side view of a motor vehicle in accordance with this invention configured in a pick-up style.

When in the pick-up or convertible style, the upper tailgate 7 can, if required, be opened to form a windbreak behind the front row of seats 9. FIG. 33 shows the motor vehicle in a pick-up style with the upper tailgate raised to separate the passengers from the articles being carried. In this case a bicycle is being carried. To form the pick-up style of motor vehicle from a hatchback vehicle the rear roof member 6 is lowered into its stored position without moving the front roof member 5. Such a transformation can be an intermediate step in the transformation from a hatchback to a convertible vehicle or can be a separate transformation process. In either case, the main part of the process is the stowing of the rear roof member 6 in the manner described above.

It will be appreciated that, even when the vehicle is in the convertible style, the luggage area 11 can still be accessed via the lower tailgate 8 and has a similar or the same carrying capacity to the luggage area when the vehicle is in the style of a hatchback motor vehicle.

In the transformation process described above the front roof member 5 starts to move from its raised position to its stowed position before the rear roof member 6 has completed moving to its stored position so as to minimise the time taken for the vehicle 1 to transform and, when the opposite transformation is taking place, the rear roof member 6 will start to move back to its raised position before the front roof member 5 has returned fully to its raised position this need not be the case.

For example, the vehicle could be arranged to operate in the mode previously described and a further mode in which the rear roof member 6 is fully lowered to its stowed position without moving the front roof member 5 from its raised position. This has the advantage that a third style of motor vehicle can be formed. When the rear roof member 6 is fully stowed, the luggage area 11 of the vehicle 1 is open to the atmosphere and with the front roof member 5 still in its raised position the vehicle has been transformed into a pick-up style of vehicle. If additional load space is required this transformation can also include folding forward of the backrests of one but preferably all of the seats in the rear row of seats 10 so as to form a flat large load carrying area. This transformation to a pick-up is advantageous in that it allows large bulky items that would not fit within the confines of the hatchback style of vehicle to be carried.

It will be appreciated that the movement of the front and rear roof member 5 and 6 is controlled by an electronic controller (not shown) and that various alternative modes of operation could be provided such as automatic full transformation from hatchback to convertible, partial transformation to an intermediate state such as the pick-up style and transformation from the pick-up style to one of the other two styles.

Although the invention has been described with reference to a hatchback style of vehicle having two rows of seats it could be applied to other types of two box motor vehicle such as an MPV or estate style or to roof structures having more than two roof members. In these cases the rear roof member will still be stowed within the passenger compartment but may be stowed behind a second row of seats if the vehicle has three rows of seats and the front roof member may comprise of more than one panel so that one of the panels stows as described above onto a rear part of the vehicle and the other panel stows in some other manner or is removable from the vehicle.

Therefore, for example, a MPV style of vehicle having three rows of seats can by using this invention be transformed into a convertible having two rows of seats or into a pick-up having two rows of seats.

Figure 31:
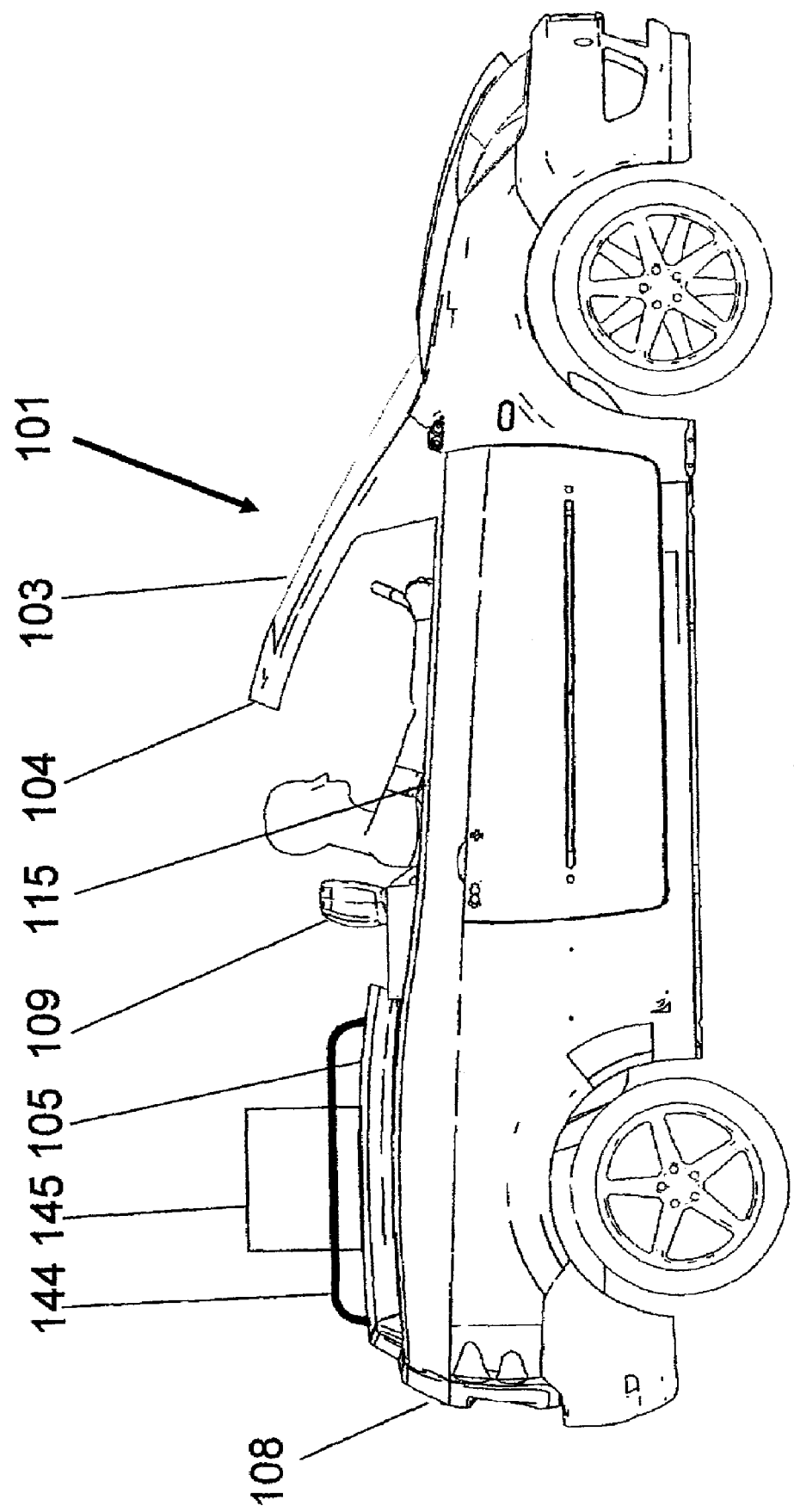
FIG. 31 is a side view of a motor vehicle fitted with a device for securing articles to the front roof member showing the front roof member in a lowered carriage or loading position.
Figure 32:
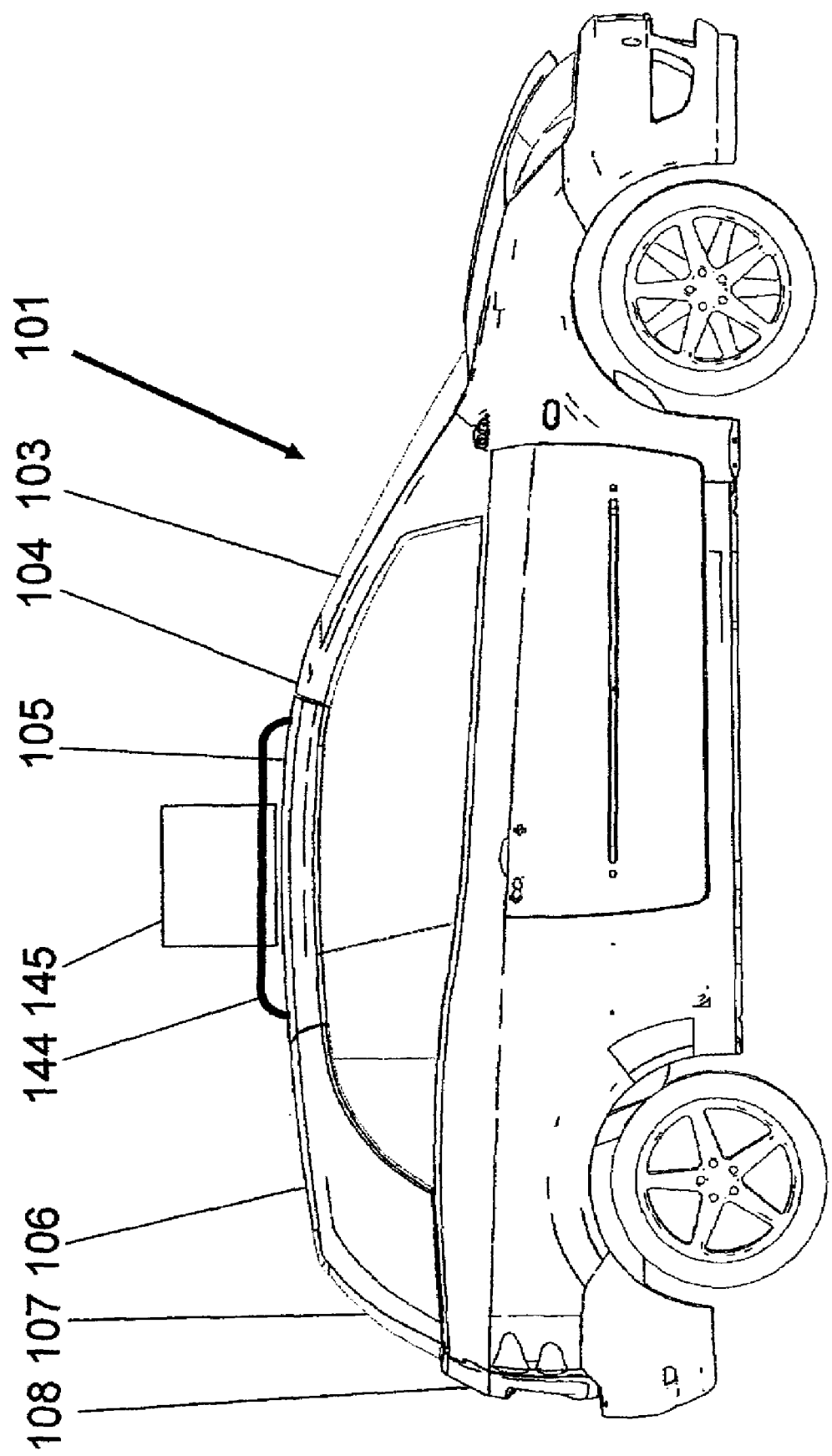
FIG. 32 is a side view of the motor vehicle shown in FIG. 31 with the front roof lifted into a raised carriage position.

In FIGS. 31 and 32 a motor vehicle 101 that is identical in most respects to that previously described is shown. The only significant difference to the motor vehicle previously described is that this motor vehicle has a device for carrying articles 144 fitted to a front roof member 105. As before the vehicle has upper and lower tailgates 107 and 108 a rear roof member 106 a windscreen 103 bounded at an upper edge by a transversely extending cross-rail 104 two rows of seats of which only the front row 109 is shown and has a waistline 115.

Operation of the front and rear roofs 105, and 106 is as previously described.

The device for carrying articles is in this case a luggage rack 144 used to carry an article in the form of a box 145 but could be a ski rack, a bicycle rack, a canoe rack, a windsurfer rack a ladder rack or any other type of device for securely fastening articles to the roof of the motor vehicle 101.

Because of the ability of the front roof member 105 to be moved from the stowed to the raised position or vice-versa, a heavy object such as the box 145 can be secured to the luggage rack 144 when the front roof member 105 is in the stowed position (FIG. 31) and then the front roof member 105 can be moved to the raised position (FIG. 32) thereby eliminating the need to lift heavy articles onto the luggage rack 144 of the motor vehicle 101 when the front roof member 105 is raised.

This is clearly advantageous in that it reduces the risk of back injury to the person loading the heavy article and will allow someone with insufficient strength to lift the article onto the raised roof member 105 but who is able to lift the object to the waistline 115 of the motor vehicle 101 to successfully load and secure the heavy article 145 in place with the roof member 105 down and then raise the roof member 105 so that the interior space of the motor vehicle can be fully utilised.

It will also be appreciated that the article 145 could also be transported with the roof member 105 in the stowed position if required.

With particular reference to FIGS. 14 to 29 there is shown in greater detail the stowage mechanisms 20, 30 used for the front and rear roof members 5 and 6.

The stowage mechanism 20 for the front roof 5 comprises of a front and a rear "S" shaped arm 22, 23 and an electric motor 21 (shown only on FIG. 1). In this case the front arm 22 is connected to the electric motor 21. However, it will be appreciated that the rear arm 23 could alternatively be the driven arm or both of the arms 22, 23 could be driven if required. It will be appreciated that on each side of the vehicle 1 there will be a pair of arms and a motor to move the arms.

The front arm 22 is pivotally connected at its upper end to the front roof member 5 and is pivotally connected at it lower end to part of the lower body structure of the vehicle 1 and the rear arm 23 is similarly connected at its upper end to the front roof member 5 and is pivotally connected at it lower end to part of the lower body structure of the vehicle 1.

The locations of the upper pivotal connections for the two arms 22, 23 are positioned close to a transverse balance axis position substantially halfway between the front and rear edges of the front roof member 5 passing through the centre of gravity of the front roof member 5. The positioning of the positions of pivotal attachment of the two arms 22, 23 to the front roof member 5 is such as to ensure that the front roof member 5 is effectively balanced upon the two arms 22, 23 and that there are no large forces acting on the arms 22, 23 trying to rotate the front roof member 5 about a transversely extending axis. If the front roof member 5 is connected to the two arms at, for example, a position near to the rear edge of the front roof member 5 then it will be appreciated that there will be a considerable turning moment exerted upon the two arms 22, 23 due the offset between the positions of attachment and the centre of gravity of the front roof member 5. This would require the use of stronger arms and a larger more powerful motor which in both cases is undesirable.

In the example shown the front arm 22 is pivotally connected at its upper end to the front roof member 5 at a position slightly in front of the balance axis and the rear arm 23 is pivotally connected at its upper end to the front roof member 5 at a position slightly to the rear of the balance axis.

It will be appreciated that if each of the arms was straight then due to the positioning of the upper pivotal connections near to the balance axis of the front roof member 5 they would present a considerable impediment to ingress and egress from the passenger compartment when the front roof member 5 is in the raised position. It is for this reason that they are both provided with double cranks so that when viewed from the side they are substantially "S" shaped because when so shaped they do not significantly affect ingress and egress from the passenger compartment 12 when the front roof is raised because they extend substantially vertically upwardly for the portion of their length where they traverse from the lower body structure to the front roof member 5. The top bend ensures that the ingress and or egress is not adversely affected and the lower bend ensures that the arms extend substantially vertically and do not cross over the rear side window 14.

The electric motor 21 is driveably connected to the front arm 22 and has a rotatable output shaft (not shown) to which is attached a worm gear (not shown) and a gearwheel (not shown) is attached to the front arm 22. Rotation of the worm gear will cause the front arm 22 to be correspondingly rotated either rearwardly or forwardly depending upon the direction of rotation of the worm gear.

It will be appreciated that the two arms 22, 23 form in combination with the front roof member 5 and the lower body structure a four bar linkage which is positioned so as to ensure that the orientation of the front roof member 5 remains virtually the same throughout the transition from the raised position shown in FIG. 1 to the stowed position shown in FIG. 13. It will however be appreciated that if required the orientation of the front roof member could be changed as it is transitioned so that when in the stowed position it is orientated at the correct angle to align with the lower body structure that it rests upon.

Operation of the front roof stowage mechanism 20 is straightforward, when the front roof member 5 needs to be lowered the motor is switched on and the interengaged worm gear and gearwheel cause the first arm 22 to be rotated in an anticlockwise direction causing the front roof to moved rearwardly and then downwardly along a curved path or arc defined by the positioning and respective lengths of the two arms 22, 23. When the front roof member 5 reaches its stowed position a sensor either on the lower body structure, the front roof structure 5, one of the arms 22, 23 or the motor 21 is used to switch off the motor 21 to prevent further damage occurring to the stowage mechanism 20. A corresponding sensor is provided to switch off the motor 21 when the front roof member 5 is moved back from the stowed position to its raised position to switch off the motor when the front edge of the front roof member 5 contacts the transversely extending cross-rail 4. The sensors could be in the form of a current sensor used to detect when the current to the electric motor rises above a predetermined level or could be contact or proximity sensors.

With particular reference to FIGS. 14 to 23 there is shown a stowage mechanism 30 for the rear roof member 6.

The motor vehicle 1 has a pair of rear stowage mechanisms 30, one on each side of the rear roof member 6 to move the rear roof member 6 from the raised position, in which it forms part of the cover for a passenger compartment 12 of the motor vehicle 1, to a stowed position, in which the portion of the passenger compartment 12 previously covered by the rear roof member 6 is exposed to the surrounding atmosphere.

For simplicity and understanding only the rear roof stowage mechanism 30 on the right hand side of the motor vehicle 1 will be described in detail but it will be appreciated that the left hand side roof stowage mechanism is similarly constructed.

The stowage mechanism 30 comprises of an endless drive mechanism in the form of a chain drive having an endless drive member in the form of a chain 31 driveably connected to a part of the rear roof member 6 by a driven member in the form of a driven pin 38 which is used to replace one of the chain pins normally used to connect together adjacent links on the chain 31. The driven pin 38 is fastened to a connecting member in the form of a plate 40 which is fastened at an opposite end to the rear roof structure 6. A guide member in the form of a guide pin 39 is also fastened to the plate 40 so that a fixed distance is maintained at all times between the driven pin 38 and the guide pin 39.

A guide track in the form of a slot 32 formed in an elongate member is provided for guiding the guide member 39 along a predetermined path. It will be appreciated that other forms of guide track could be used but a simple slot is preferred because it is a simple and cost effective to produce.

A drive means in the form of an electric motor 35a is used to cause the chain 31 to be selectively moved so as to cause the driven pin 38 to move from a first position corresponding to a position in which the rear roof member 6 is in the raised position to a second position corresponding to a position in which the rear roof member 6 is in the stowed position.

The chain drive mechanism further comprises a gearwheel 35 engaged with the chain 31 and driven by the electric motor 35a, a lower chainwheel 37 engaged with the chain 31, an idler gearwheel 36 engaged with the chain 31 and being moveable by a chain adjuster means (not shown) to adjust the tension in the chain 31 an upper rear chainwheel 33 engaged with the chain 31 and an upper front chain wheel 34 engaged with the chain 31.

Figure 27:
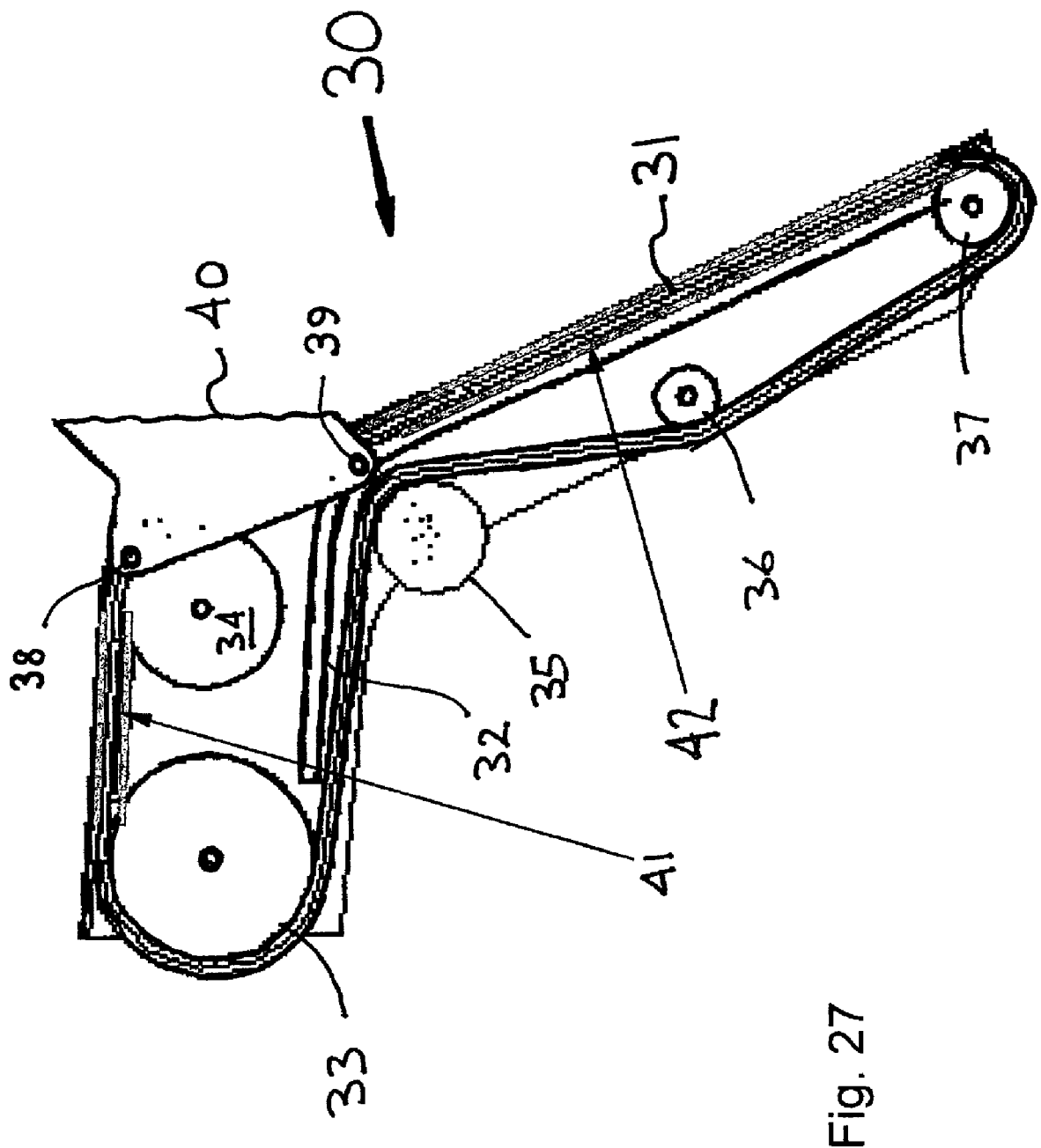
FIG. 27 is a side view of the rear roof stowage mechanism shown in FIGS. 14 to 26 on a larger scale.
Figure 28:
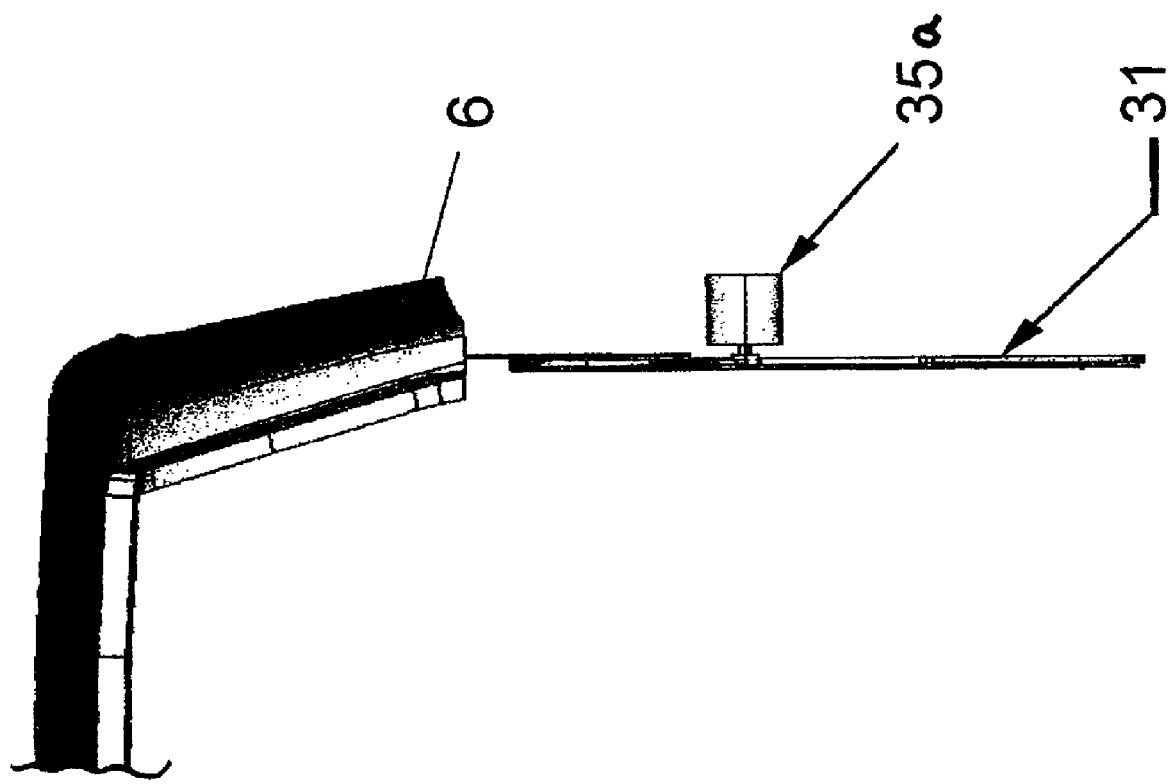
FIG. 28 is a rear view of the rear roof stowage mechanism shown in FIGS. 14 to 28.

As can best be seen with reference to FIG. 27 the upper front and rear chainwheels 34 and 33 have respective axes of rotation that are arranged to lie on a common substantially horizontally arranged plane but the diameter of the front chainwheel 34 is smaller than the upper rear chainwheel 33 so that the path of the chain 31 is inclined downwardly if a point on the chain 31 moves from the upper rear chainwheel 33 to the upper front chainwheel 34.

Similarly, the motor driven chainwheel 35 is positioned such that a point on the chain 31 follows an inclined upwardly path as a point on the chain 31 moves from the motor driven chainwheel 35 to the upper rear chainwheel 33.

The lower chainwheel 37 is positioned below and in front of all the other chainwheels 33, 34, 35 and 36 so that a point on the chain 31 follows a vertically inclined downward path as the point moves from the upper front chain wheel 34 to the lower chainwheel 37. The term vertically inclined means that the path is inclined at an angle of less than 45 degrees to the vertical.

In practice it is desirable to arrange the angle of this vertical inclination to be the same as the vertical inclination of the backrests fitted to the front row of seats 9 and it is preferable if the inclination of the front row of seats 9 is limited by an end stop or the position is controlled so that the backrests are moved automatically into a predetermined vertical inclination when transformation of the vehicle 1 from the hatchback style is started. In a preferred embodiment both the inclination of the backrests and the fore-aft positioning of the front row of seats 9 within the passenger compartment 12 is automatically set when the transformation to the convertible vehicle style is started.

The slot 32 follows a similar but offset path to the chain 31 being inclined downwardly from one end position near to the upper rear chainwheel 33 to a knee or corner position located forwardly with respect to the motor driven chainwheel 35 from where it follows a downward vertically inclined path that in this case runs parallel to the path followed by the chain 31 from the upper front chainwheel 34 to the lower chainwheel 37.

Chain guides 41, 42 are provided to ensure that the chain 31 follows a predetermined path at least from the upper rear chainwheel 33 to the upper front chainwheel 34 and from there to the lower chainwheel 37.

It will be appreciated that the motor 35a could be fastened to one of the other chainwheels 33, 34, 36 or 37 and that in such a case the chainwheel 35 could be either a simple idler or a chain tensioning idler.

The distance of the slot 32 from the chain 31 in the section that extends from the one end of the slot 32 near to the upper rear chainwheel 33 to the upper front chainwheel 34 must be less than the distance between the driven pin 38 and the guide pin 39 because the distance between the driven and guide pins 38 and 39 is fixed. The distance between the chain 31 and the slot 32 compared to the distance between the driven and guide pins 38 and 39 will naturally determine the angle that rear roof member 6 will be in when the drive pin 38 attached to the chain 31 is positioned between the upper rear chainwheel 33 and the upper front chainwheel 34 and the guide pin 39 is in the corresponding section of the slot 32. Preferably, the distance between the driven and guide pins 38 and 39 will be significantly greater than the distance between the chain 31 and the slot 32 because this increases the angle of the rear roof member 6 and reduces the effect of tolerances on the system which may cause the roof to wobble as it is moved.

The paths followed by the chain 31 and the slot 32 determine the movement of the rear roof member 6. The path of the chain 31 from the upper rear chainwheel 33 past the upper front chainwheel 34 to the lower chainwheel 37 is in the form of an inverted "L" shape having a relatively short almost horizontal upper path length and a longer more vertical path length. The path of the slot 32 is similarly like an inverted "L".

Figure 14:
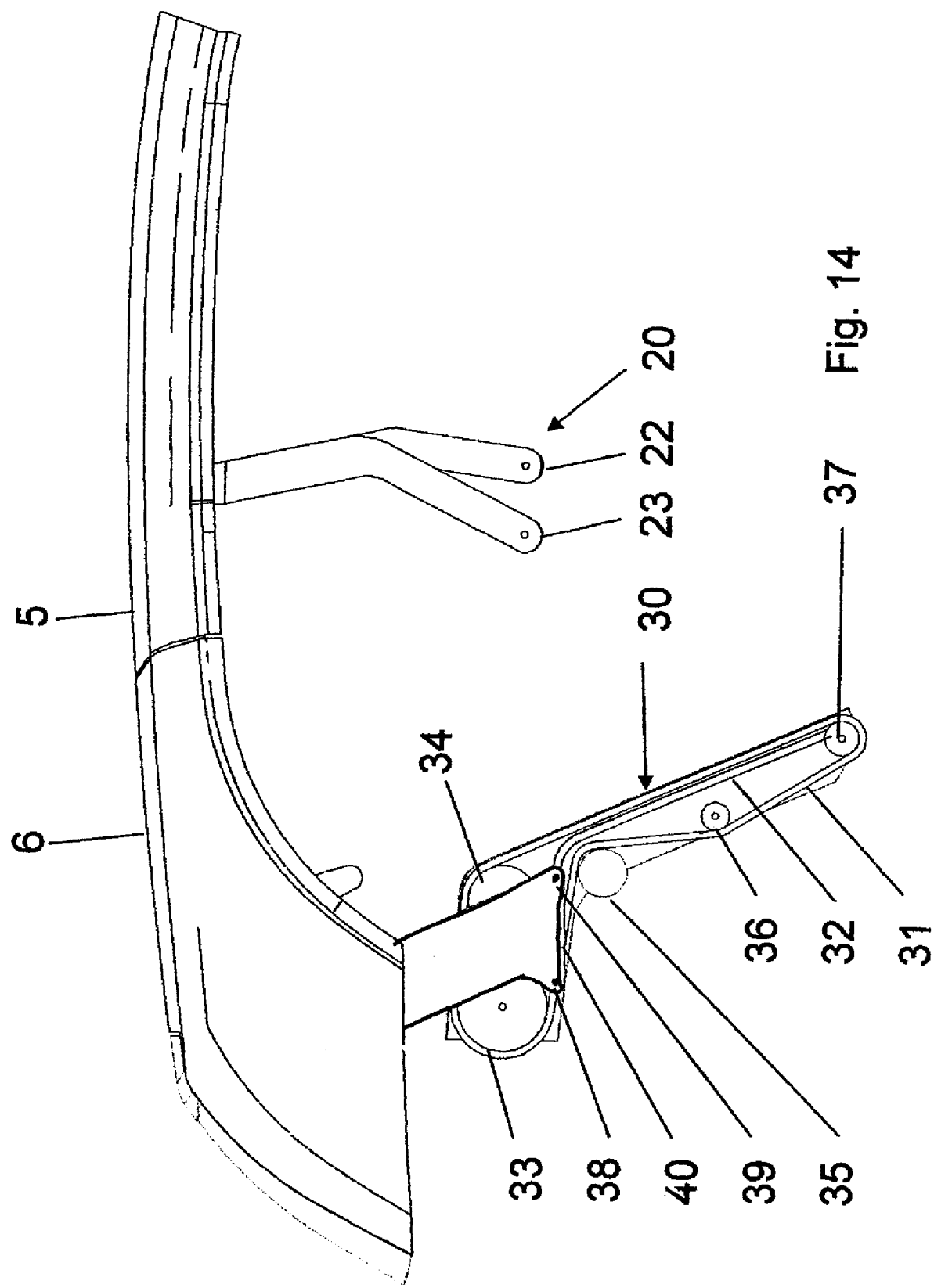
FIG. 14 is a side view showing the mechanisms in positions corresponding to FIGS. 1 and 2.

Operation of the stowage mechanism 30 is as follows, when the rear roof member 6 is in the raised position the chain 31, the driven pin 38 and the guide pin 39 are positioned as shown in FIG. 14. Both of these respective positions are referred to as the first positions of the driven and guide pins 38 and 39. In the first position, the driven pin 38 is in a portion of the chain 31 between the motor driven chainwheel 35 and the upper rear chainwheel 33 and the guide pin 39 is positioned in a short upwardly inclined upper portion of the slot 32.

Figure 15:
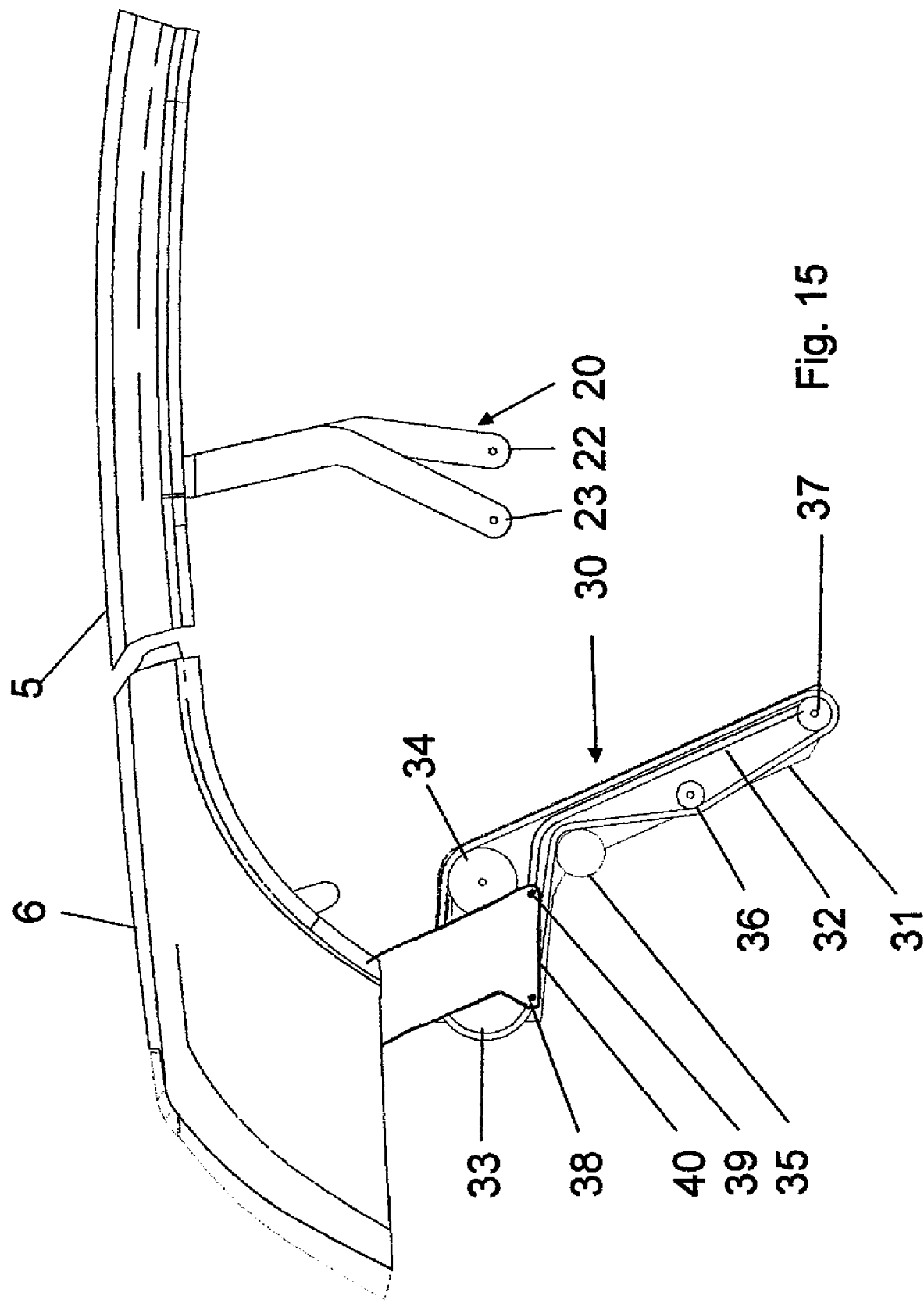
FIG. 15 is a side view showing the mechanisms in positions corresponding to FIG. 3.

When the motor 35a is activated to move the rear roof member 6 from the raised position the motor driven chainwheel 35 will begin to rotate in a counter clockwise direction. This rotation will initially cause the driven and guide pins 38 and 39 to be moved from their respective first positions rearwardly and upwardly towards respective third positions as shown in FIG. 15 and the rear roof member 6 will also move rearwardly and slightly upwards so as to reduce the pressure on any seals located between the rear roof member 6 and the lower body structure of the vehicle 1. It will be seen from FIG. 15 that the driven and guide pins 38 and 39 follow substantially parallel paths during this part of the operating cycle. The driven pin 38 is positioned at the lower edge of the upper rear chainwheel 33 when it is in the third position so that it is just becoming engaged by the upper rear chainwheel 33.

Figure 16:
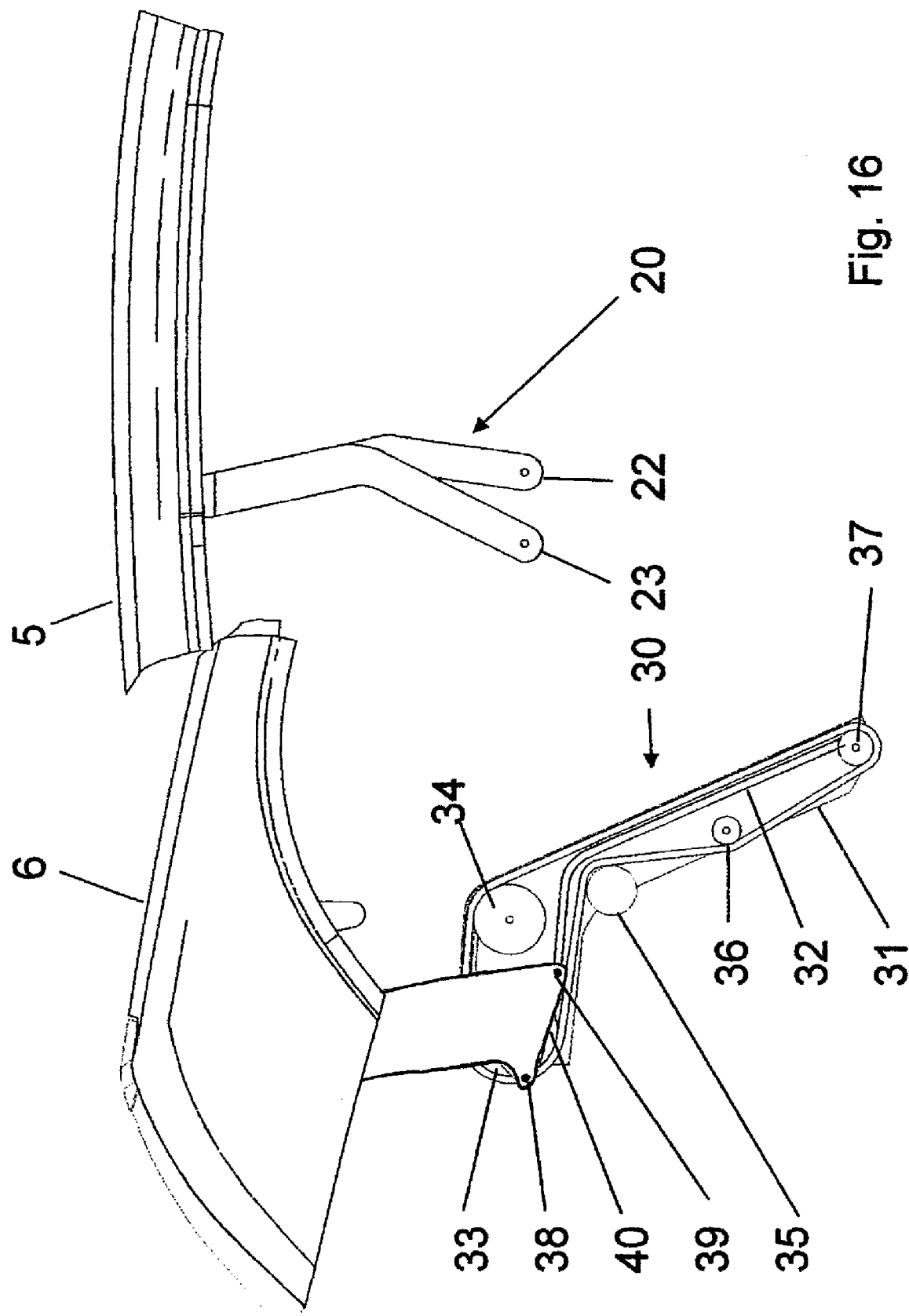
FIG. 16 is a side view showing the mechanisms in positions corresponding to FIG. 4.
Figure 17:
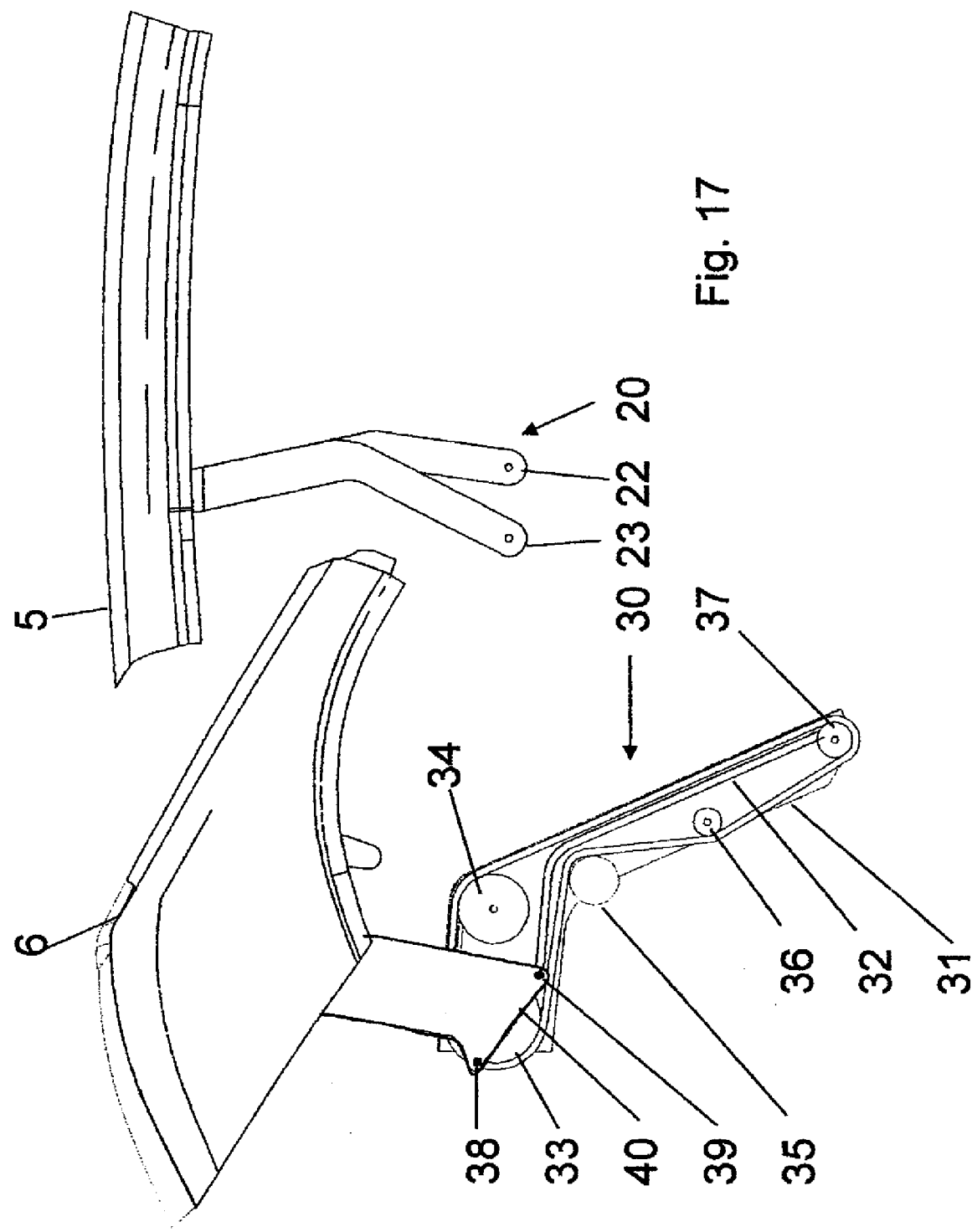
FIG. 17 is a side view showing the mechanisms in positions corresponding to FIG. 5.
Figure 18:
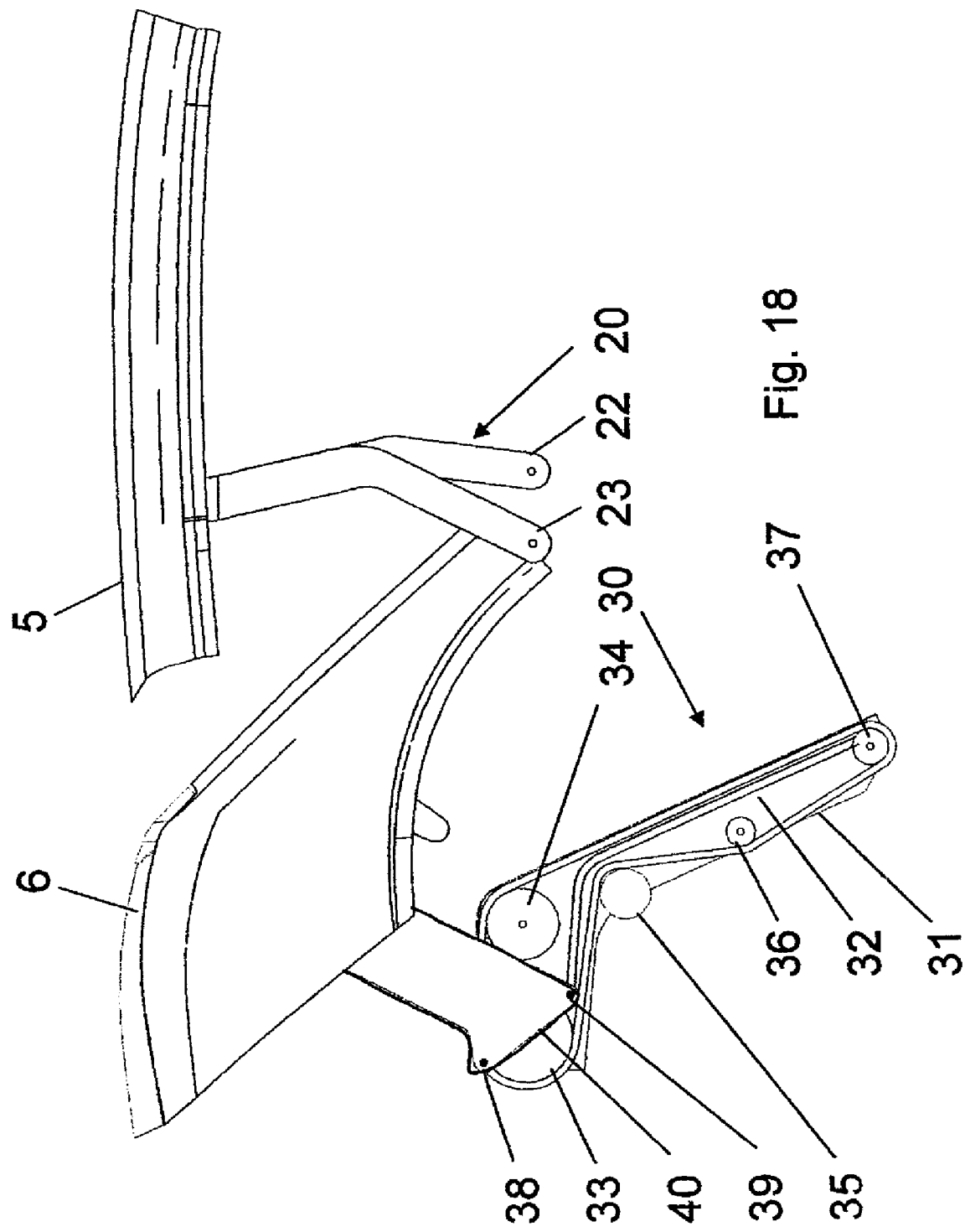
FIG. 18 is a side view showing the mechanisms in positions corresponding to a position between those shown in FIG. 5 and FIG. 6.

In FIGS. 16 to 18 the next phase of operation occurs and the driven and guide pins 38 and 39 move from their third positions to fourth positions. The driven pin 38 is positioned at the upper edge of the chainwheel 33 when it is in the fourth position so that it is just becoming disengaged from the upper rear chainwheel 33.

During this phase the driven and guide pins 38 and 39 follow different paths because the driven pin 38 moves around the circumference of the upper rear chainwheel 33 so that its motion becomes predominantly upwardly but the guide pin moves slightly rearwardly and upwardly during this phase as determined by the slot 32.

This difference in direction of movement causes the rear roof member 6 to rotate forwardly so that the front edge of the rear roof member 6 drops down below the rear edge of the front roof member 5 thereby allowing the front edge of the rear roof member 6 to pass under the rear edge of the front roof member 5 at a later phase of operation.

Figure 19:
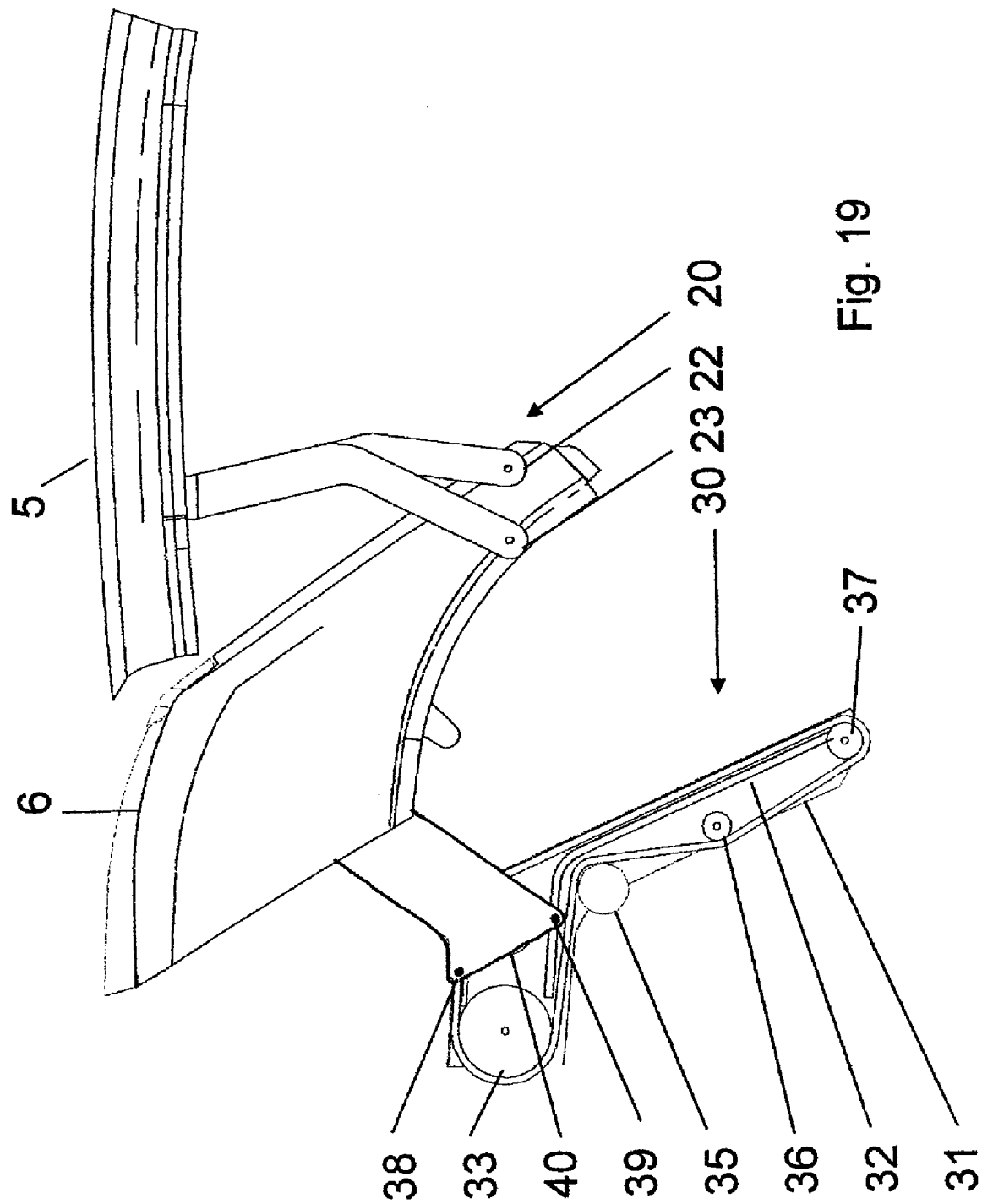
FIG. 19 is a side view showing the mechanisms in positions corresponding to FIG. 6.
Figure 20:
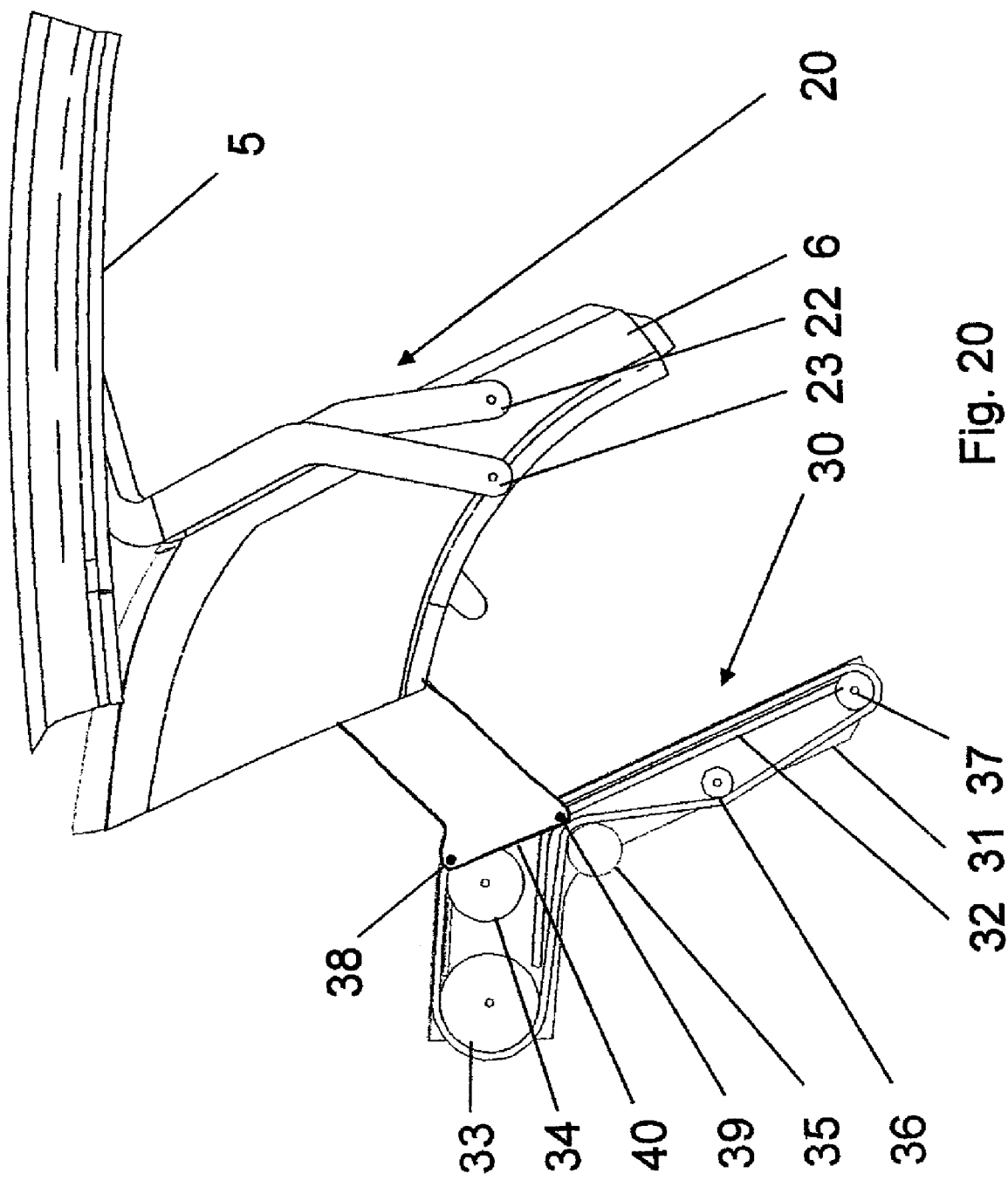
FIG. 20 is a side view showing the mechanisms in positions corresponding to FIG. 7.

As the chain 31 continues to move in the same direction the driven and guide members 38 and 39 are moved on from their respective fourth positions forwardly as indicated in FIG. 19 to respective fifth positions indicated generally in FIG. 20. In the fifth position the driven pin 38 is positioned at the upper edge of the upper front chainwheel 34 so that it is just becoming engaged by the upper rear chainwheel 34.

During this period of motion the driven and guide pins 38 and 39 move primarily forwardly, although because the path of the chain 31 and the slot 32 is inclined downwardly there is also some downward motion. The motion is therefore along respective downwardly inclined planes. This phase of the operation is positioning the rear roof member 6 ready to be lowered into its stored position and the rear roof member 6 passes under the rear edge of the front roof member 5.

Figure 21:
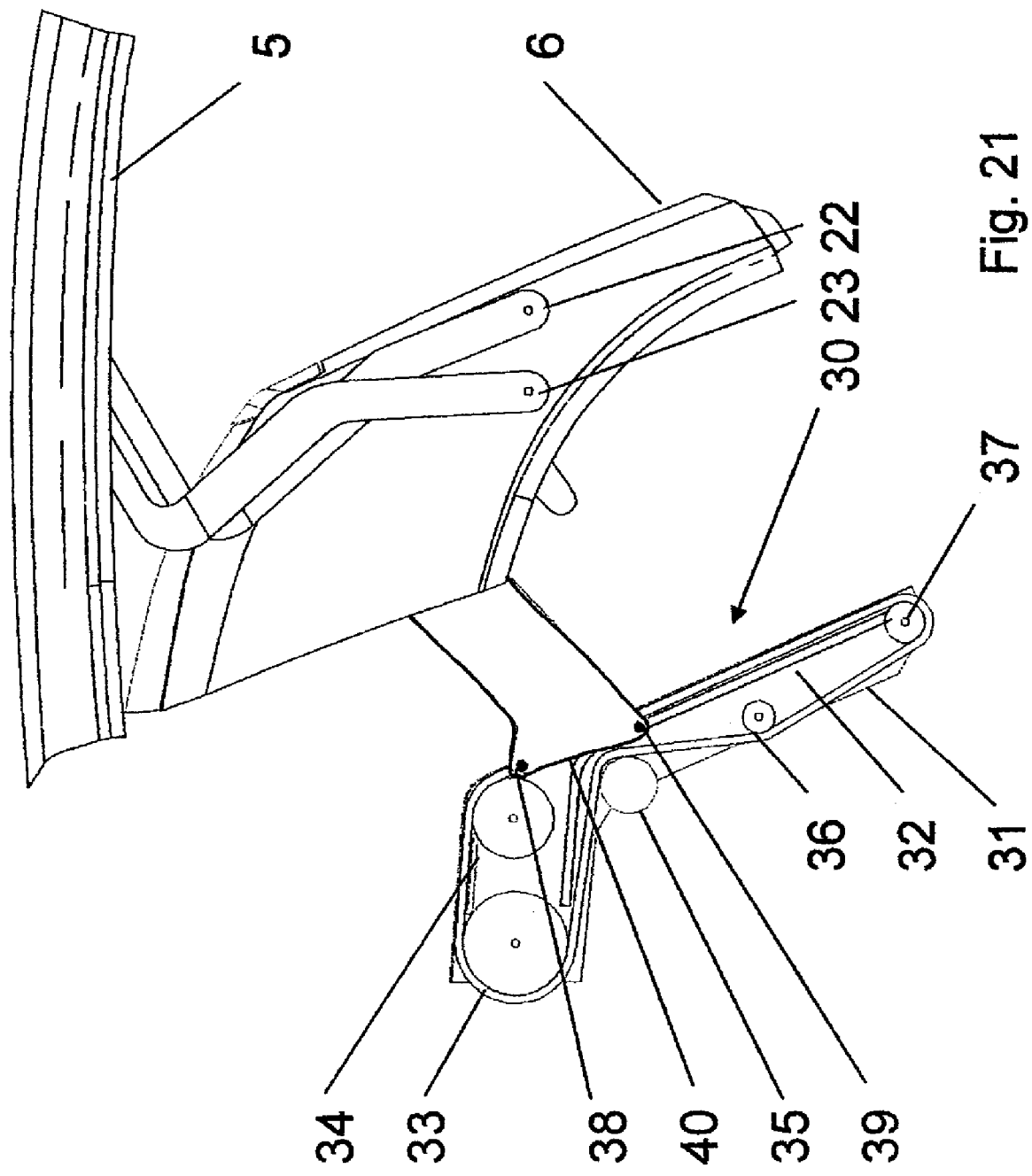
FIG. 21 is a side view showing the mechanisms in positions corresponding to FIG. 8.

The next phase is to complete the forward rotation of the rear roof member 6 which is achieved when the driven pin 38 moves around the upper front gearwheel 34 to move from the fifth position shown in FIG. 20 to a sixth position shown in FIG. 21. The driven pin 38 is just becoming disengaged from the upper front chainwheel 34 when it is in its sixth position During this phase of operation the guide pin 39 remains virtually stationary but allows the plate 40 to rotate. In this position the guide pin 39 is at or close to the knee in the slot 32.

Figure 22:
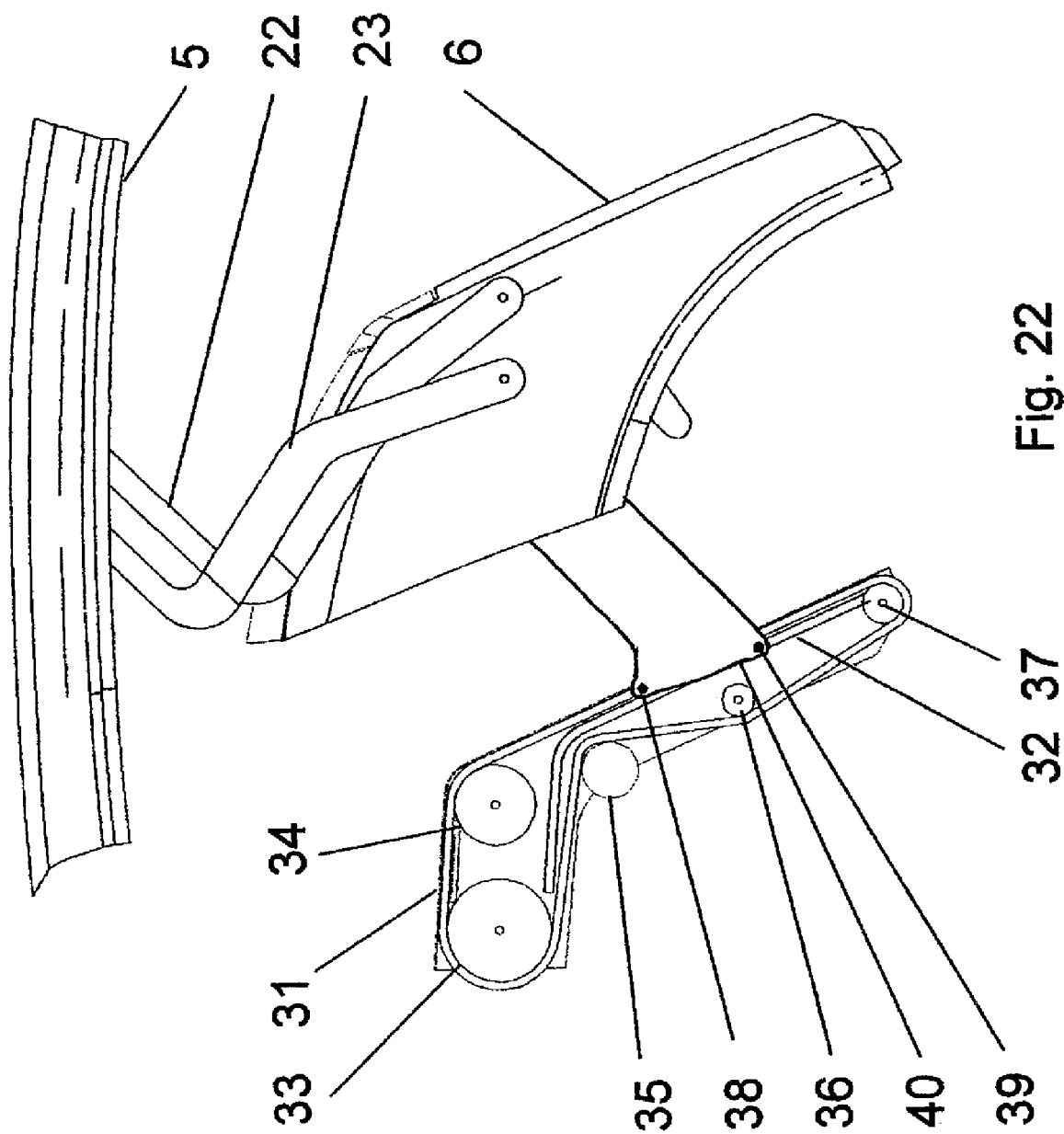
FIG. 22 is a side view showing the mechanisms in positions corresponding to FIG. 9.
Figure 23:
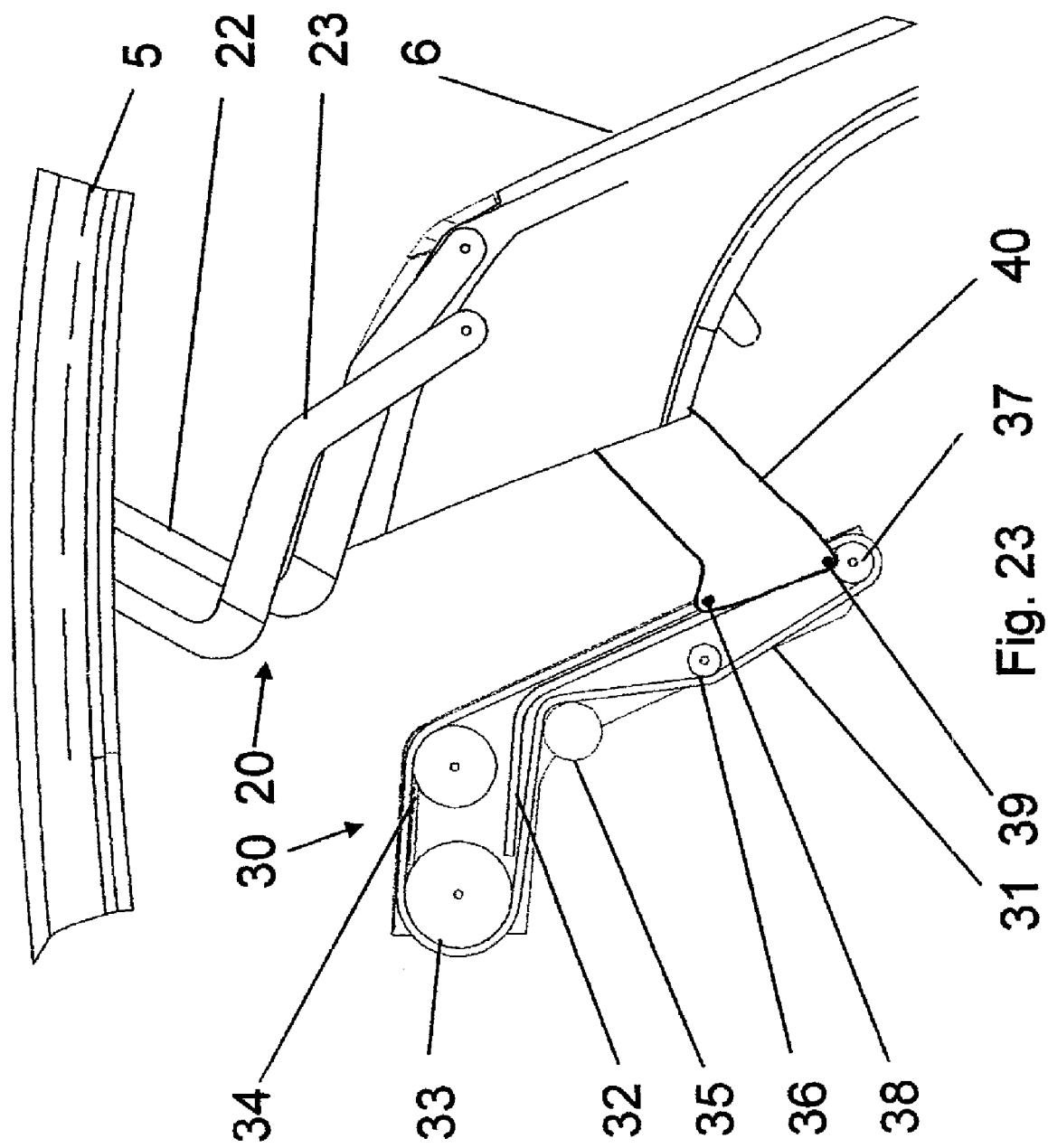
FIG. 23 is a side view showing the mechanisms in positions corresponding to FIG. 10.

The final phase of operation is the movement of the driven and guide members 38 and 39 from their respective sixth positions to their respective second positions as shown in FIGS. 22 and 23. In the second position the driven pin 38 is positioned close to but not in engagement with the lower gearwheel 37. The second positions correspond to the stored position of the rear roof member 6 and this motion is primarily downwardly. However, due to the path followed by the chain 31 from the upper front chainwheel 34 to the lower chainwheel 37 and the corresponding path of the slot 32, the movement of the driven and guide members 38 and 39 from the respective fourth positions to their respective second positions is actually along respective vertically inclined planes.

When the driven pin 38 and the guide pin 39 reach their respective second positions as indicated in FIG. 23 the motor 35a is switched off and the rear roof member 6 is positioned in its stowed position. The motor 35a is automatically switched off when the driven and guide pins 38 and 39 reach their respective second positions by means of one or more sensors (not shown).

The sensor or sensors may sense the current being supplied to the motor 35a or alternatively proximity or contact sensors could be used to switch off the motor 35a.

Figure 24:
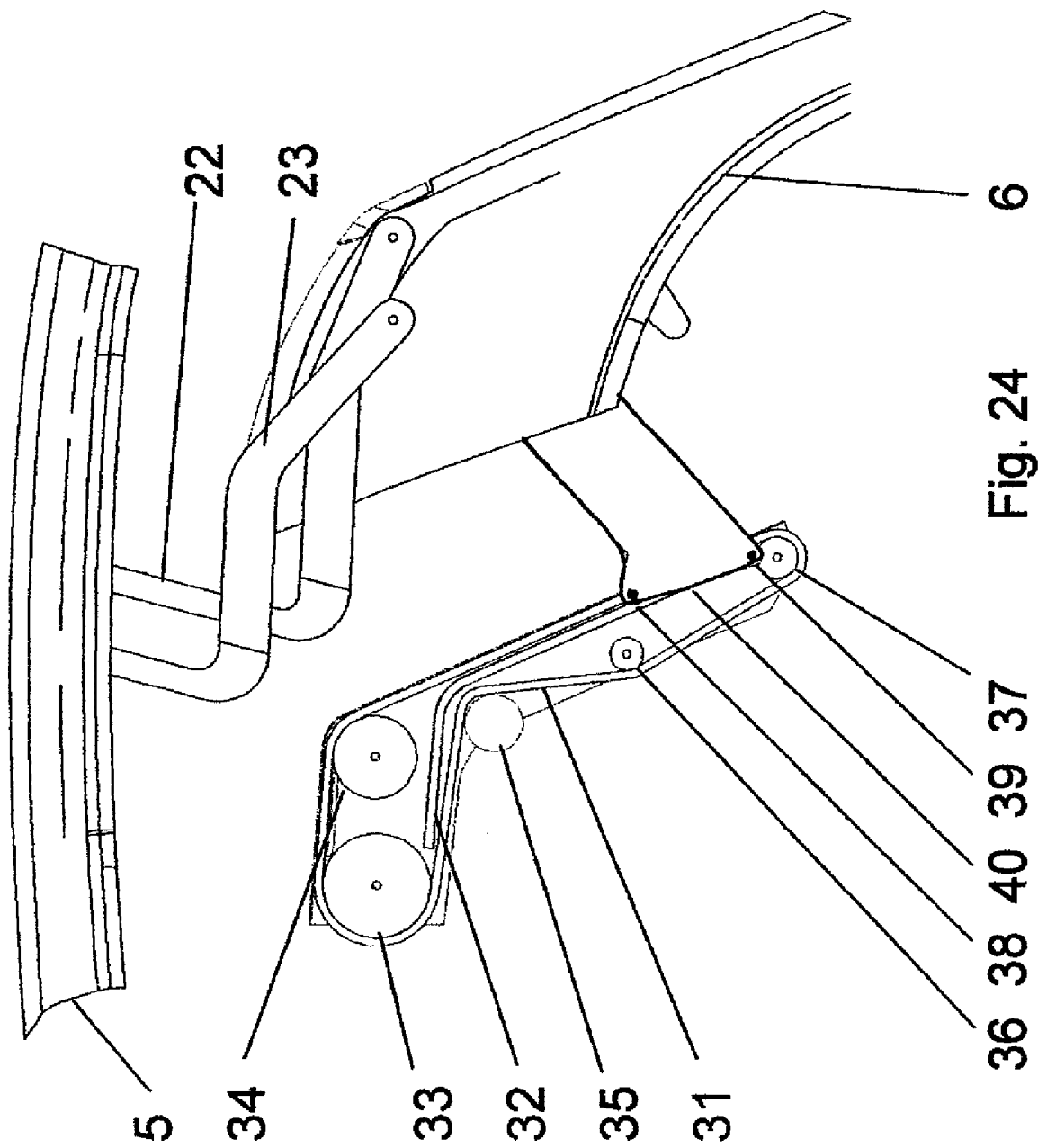
FIG. 24 is a side view showing the mechanisms in positions corresponding to FIG. 11.
Figure 25:
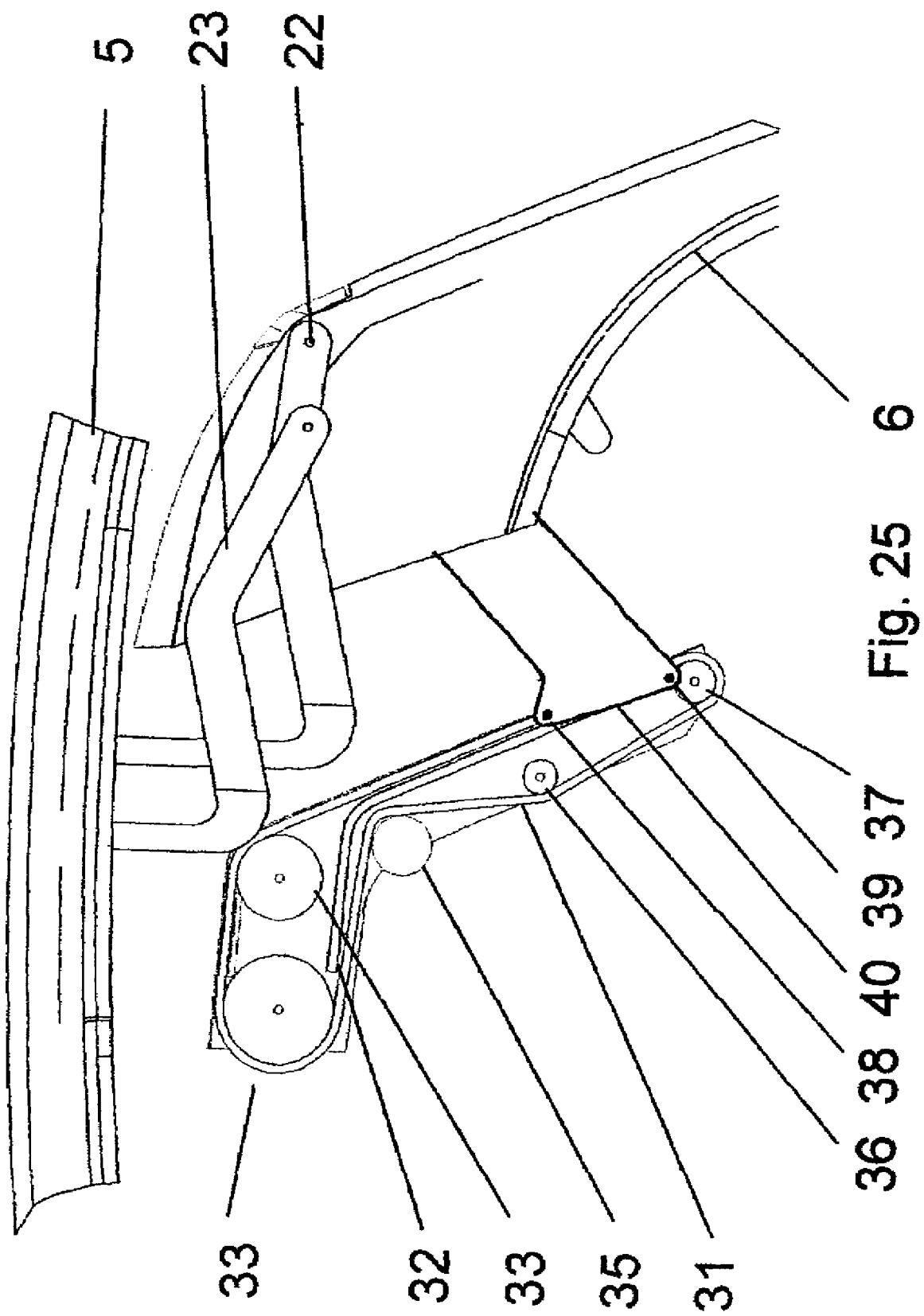
FIG. 25 is a side view showing the mechanisms in positions corresponding to FIG. 12.
Figure 26:
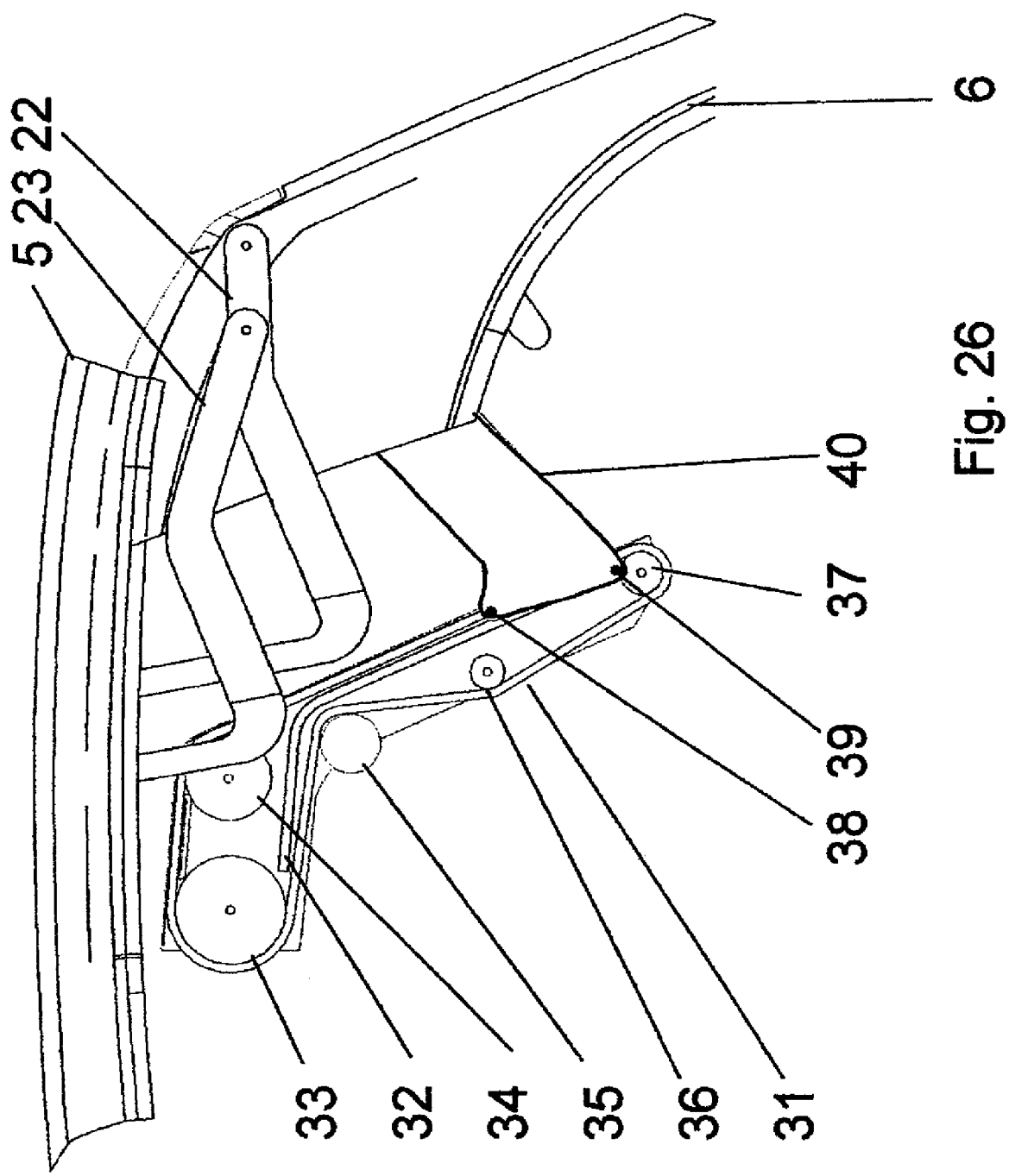
FIG. 26. is a side view showing the mechanisms in positions corresponding to FIG. 13.

The positions of the driven and guide pins 38 and 39 shown in FIGS. 24 to 26 are the same as those shown in FIG. 23 because the motion of the rear roof 6 has been terminated and only the motion of the front roof member 5 is continuing.

It will be appreciated that by re-energizing the electric motor 35a so that the motor driven chainwheel 35 starts to rotate in a clockwise direction the motion of the rear roof member 6 will be reversed and it will be returned to its starting or raised position and the driven and guide pins 38 and 39 are moved back to their first positions shown in FIG. 14.

During this reverse transformation process the rear roof member 6 is first raised up from the stowage position in the passenger compartment of the vehicle 1 and is then moved rearwardly and rotated rearwardly before it is finally moved back forwardly and downwardly to reengage it with the front roof member 5 and to compress the seals position between the rear roof member 6 and the lower body structure.

One of the significant advantages of an endless drive mechanism is that the width or thickness of the endless drive member is very small. This can best be seen in FIG. 28.

The narrowness of this type of mechanism means that a chain or belt drive mechanism can be easily packaged or located in the motor vehicle 1 whereas some other forms of potential actuation mechanism such as rams are less easily packaged. It will be appreciated that the rear roof member sits on the lower body structure when it is in the raised position and so must be wider than the lower body structure upon which it rest but stows within the lower body structure when lowered. This is achieved partly by the use of the flaps and partly by tapering the vehicle so that it is wider at the position where it is stowed than at the position where it rests when raised and the rear roof member is also wider where it abuts the lower body structure than it is where it is substantially flat. This tapering of the rear roof member is how the rear roof member can stow behind the front row of seats without the flaps extending up to the front row of seats and also how the rear roof member 6 can move under and to the inside of the front roof member 5 as it is stowed.

It is however still very problematic to stow the rear roof member in this manner and the use of a stowage mechanism that is very compact is particularly advantageous for this use.

In addition, the chain drive mechanism disclosed provides in a simple and cost effective manner a means of not only rotating the rear roof member 6 through at least 45 degrees but also of lowering the rear roof member 6 down so that it is conveniently stowed within the passenger compartment where it occupies little space due to its vertically inclined orientation.

Although the invention has been described with reference to a preferred embodiment using a simple chain drive it will be appreciated that similar advantages could be obtained by replacing the chain drive with another form of endless drive mechanism such as a belt drive or toothed belt drive.

It will further be appreciated that the electric motor 35a could be replaced by a hydraulic motor and/or both of the chain drive mechanisms could be driven by a common motor with one or more drive shafts or other power transmission devices connecting the respective chain drives on each side of the motor vehicle to the common motor.

It will be appreciated that in the case of the motor vehicle described the rear roof member has to be moved rearwardly, rotated, moved forwardly and lowered to move from its raised to its lowered positions but this might not necessarily be the case it may only need to be moved rearwardly, rotated and lowered depending upon the configuration of the motor vehicle to which it is fitted.

It will be appreciated by those skilled in the art that, although the invention has been described with reference to one or more preferred embodiments, the invention is not limited to these disclosed embodiments and that various alternative embodiments or modifications to the disclosed embodiments could be made without departing from the scope of the invention.

What is claimed is:

1. A motor vehicle having a body structure including a multi-piece roof structure having a number of roof members reversibly moveable by respective stowage mechanisms between raised and stowed positions, the arrangement being such that, when all of the roof members are in their respective raised positions, a two box motor vehicle having an engine compartment and a combined passenger and luggage compartment having at least two rows of seats including a front row and a rear row is formed and, when at least one of the roof members is moved into its respective stowed position, an alternative style of motor vehicle is formed wherein the multi-piece roof structure includes a rear roof member which, when in the stowed position, is located between two of the at least two rows of seats.

2. A motor vehicle as claimed in claim 1 wherein the motor vehicle has two rows of seats comprising a front row which includes a seat for a driver of the motor vehicle and a rear row which includes one or more seats for passengers of the motor vehicle and the rear roof member, when in the stowed position, is located between the front and rear rows of seats so as to at least partially obscure the rear row of seats from view.

3. A motor vehicle as claimed in claim 2 wherein the multi-piece roof structure comprises of front and rear roof members and, when the rear roof member is moved to the stowed position and the front roof member is also moved to the stowed position, a two seat open top style of motor vehicle is formed.

4. A motor vehicle as claimed in claim 1 wherein the multi-piece roof structure comprises of front and rear roof members and, when the rear roof member is moved to the stowed position and the front roof member is retained in the raised position, a pick up style of motor vehicle is formed.

5. A motor vehicle as claimed in claim 1 in which the multi-piece roof structure comprises front and rear roof members and the stowage mechanism for the front roof member comprises a pair of elongate arms attached to each side of the front roof portion and a drive means driveably attached to at least one of the pair of arms on each side of the motor vehicle to move the arms between raised and lowered positions wherein each of the pair of arms on each side of the motor vehicle is substantially "S" shaped so as to prevent interference with ingress and egress from the motor vehicle when the front roof is in the raised position.

6. A method for converting a two box motor vehicle having an engine compartment, a combined passenger and luggage compartment in which is located at least two rows of seats including a front row and a rear row and a multi-piece moveable roof structure including a rear roof member into an alternative style of motor vehicle the method comprising moving at least the rear roof member from a raised position, in which in combination with one or more other roof members it forms a cover for the combined passenger and luggage compartment, to a stowed position in which the rear roof member is positioned between two of the at least two rows of seats.

7. A method as claimed in claim 6 wherein the motor vehicle further comprises a moveable flap on each side of the motor vehicle and the method further comprises moving both of the flaps from respective resting positions into respective raised positions in order to permit the rear roof member to be lowered into its stowed position.

8. A method as claimed in claim 6 or in claim 7 wherein the motor vehicle further comprises one or more moveable side windows on each side of the passenger compartment and the method further comprises lowering the or each side window on both sides of the passenger compartment before starting to move the rear roof.

9. A method as claimed in claim 6 wherein the multi-piece roof structure comprises of front and rear roof members and the method further comprises moving the rear roof member rearwards to disengage it from the front roof member to permit the rear roof to be moved to the stowed position.

10. A method as claimed in claim 6 wherein the method further comprises rotating the rear roof forwardly so that the front edge of the rear roof member lies below the rear edge of the front roof member, moving the rear roof member forwardly so that it passes under the rear edge of the front roof member and, when the forward motion is substantially complete, lowering the rear roof member along an inclined plane into the stowed position.

* * * * *